United States Patent [19]

Nonomura et al.

[11] Patent Number: 5,518,389
[45] Date of Patent: May 21, 1996

[54] MULTI-CAVITY MOLD APPARATUS HAVING INDEPENDENTLY CONTROLLED HEATED RUNNERS

[75] Inventors: Akira Nonomura, Tochigi; Masaharu Hata, Utsunomiya, both of Japan

[73] Assignee: Kao Corporation, Tokyo, Japan

[21] Appl. No.: 395,636

[22] Filed: Feb. 28, 1995

Related U.S. Application Data

[63] Continuation of Ser. No. 951,109, Sep. 25, 1992, abandoned.

[30] Foreign Application Priority Data

Oct. 16, 1991 [JP] Japan ................................. 3-267559
May 28, 1992 [JP] Japan ................................. 4-160023

[51] Int. Cl.$^6$ ................................................ B29C 45/78
[52] U.S. Cl. .......................... 425/144; 264/40.6; 425/570; 425/572
[58] Field of Search ................................. 425/143, 144, 425/570, 572, 573; 264/40.6

[56] References Cited

U.S. PATENT DOCUMENTS

| | | | |
|---|---|---|---|
| 3,951,375 | 4/1976 | Lovell | 425/573 |
| 4,755,126 | 7/1988 | Leverenz | 425/572 |
| 4,964,795 | 10/1990 | Tooman | 425/572 |
| 5,147,663 | 9/1992 | Trakas | 425/572 |
| 5,227,179 | 7/1993 | Benenati | 425/572 |

FOREIGN PATENT DOCUMENTS

| | | |
|---|---|---|
| 60-180811 | 9/1985 | Japan. |
| 62-109617 | 5/1987 | Japan. |
| 62-19117 | 8/1987 | Japan. |

OTHER PUBLICATIONS

Communication dated Sep. 20, 1995 from Japanese Patent Office issued in Corresponding JPA-299137.

*Primary Examiner*—Tim Heitbrink
*Attorney, Agent, or Firm*—Fish & Richardson

[57] ABSTRACT

A multi-cavity mold has flow-distribution adjusting heaters provided for respective ones of main runners branching from a common channel so as to correspond to a plurality of cavities. The amount of resin charged into the cavities is made uniform from one cavity to the next by independently controlling the heaters. Sub-runners leading respective ones of the main runners are respectively provided with heaters for adjusting gate finish. The gate finish and moldability are improved by independently controlling these heaters. The main runners hold enough resin for at least one shot, and pressure loss in the sub-runners is made equal to or greater than pressure loss in the main runners.

3 Claims, 16 Drawing Sheets

MULTI-CAVITY MOLD APPARATUS HAVING INDEPENDENTLY CONTROLLED HEATED RUNNERS

This application is a continuation of U.S. application Ser. No. 07/951,109, filed Sep. 25, 1992, now abandoned.

BACKGROUND OF THE INVENTION

1. Field of the Invention

This invention relates to a multi-cavity mold, a method of manufacturing the mold and molding control method using the mold. In the present invention, a multi-cavity mold is taken to include single cavity multi-gate molds as well. The reason is that both types of molds share a common concept in terms of having a plurality of hot runners and sub-runners.

2. Description of the Related Art

Multi-cavity molding is carried out using a multi-cavity mold. A multi-cavity mold is formed to include a plurality of cavities each having a shape the same as that of the article to be molded (in general, the shape of the cavity is formed to be larger than the article to be molded in anticipation of the amount of shrinkage of the resin molding material). In order to fill the plurality of cavities with a molten resin which flows into the mold along a single channel upon being injected from an injection molding machine, the mold is formed to have a plurality of first runners (main runners) branching from the single channel and corresponding to the plurality of cavities, as well as a plurality of second runners (sub-runners) each having two ends, wherein one end leads to the terminus of a respective one of the first runners and the other end serves as a gate facing the corresponding cavity.

In order to obtain molded articles free of such defects as warpage and without any variance in dimensions between cavities in multi-cavity molding, it is required that all of the cavities be filled with the molten resin simultaneously while such defect-causing phenomena as short shot (insufficient resin) and over-packing (excessive resin, which gives rise to burrs) are avoided. In actuality, however, the cavities and hot runners (the first and second runners) exhibit dimensional variance because of the manufacturing process, and therefore the fluidic resistance of the molten resin in the cavities differs from one cavity to another. For this reason, it is impossible to fill all of the cavities with molten resin up to the end of each simultaneously and uniformly.

Accordingly, in the conventional mold for multi-cavity molding, the practice is to control the temperature of heaters with which the hot runners are provided and change the temperature of the molten resin that will fill each cavity, thereby filling the cavities with the molten resin simultaneously.

This temperature control as practiced in the prior art will be described in greater detail. The multi-cavity mold is provided with a single first heater shared by the plurality of first runners, and with independently temperature-controllable second heaters for individual ones of the plurality of second runners. The second heaters are mainly for controlling finish at the gates. In the prior art, the second heaters are used also for the purpose of controlling the amount of resin filling the cavities.

As set forth above, the fluidic resistance of the molten resin differs from one cavity to the next since the hot runners and cavities exhibit dimensional variance. When it is attempted to fill all of the cavities with molten resin at the same temperature, the cavities for which the fluidic resistance is relatively small may be filled up to their ends with the molten resin, but the cavities of a comparatively large fluidic resistance are not filled with the molten resin sufficiently. Accordingly, the temperature of the molten resin which fills the cavities of a relatively large fluidic resistance is raised by the second heaters. The higher the temperature of the molten resin, the higher the fluidity thereof and therefore the easier it is to fill the cavities. By thus controlling the temperature of the second heaters, all of the cavities are filled with the molten resin in a well-balanced manner.

However, as mentioned above, the second heaters are for controlling the temperatures of the gates, and gate temperature is intimately concerned with gate finish and moldability. As a consequence, when different temperatures are applied to the gates to fill the cavities with molten resin in balanced fashion, certain problems arise, which will now be described.

From the point of view of gate finish, the resin at a gate is melted if the gate has a temperature that is too high. As a result, resin in the form of a thread remains at the gate of the molded article. This is a defect-causing phenomenon referred to as "strings". On the other hand, when a gate has a temperature that is too low, the resin solidifies at the gate and the mark of the gate left on the molded article defines a convex shape. This is a defect known as "high gate".

In terms of moldability, the fact that the resin at a gate is melted when the gate temperature is too high results in some of the resin flowing out of the gate opening after the mold has been opened and the molded article extracted. This is a phenomenon referred to as "drooling". When a gate has a temperature that is too low, the resin solidifies at the gate and impedes injection of the resin.

Thus, with mold temperature control in multi-cavity molding according to the prior art, it is difficult to reconcile good balance in filling the plurality of cavities with resin, satisfactory gate finish and good moldability. Controlling the distribution of molten resin to a plurality of cavities and controlling the gates by using only one type of heater (the second heaters) is itself unreasonable to start with.

Even if these two types of control can be reconciled to some degree, a problem which arises is that the molded articles will develop a disparity in terms of dimensions and weight if there is a large difference in the temperature of the introduced resin from one cavity to another. The reason for this is that when the temperature of the molten resin differs from one cavity to another, a difference is produced in the amount of resin with which the cavities are filled or supplied during the resin injection step or a dwell step (wherein dwell refers to a process in which a constant pressure is applied after the injection step in order to prevent a situation wherein the desired shape and dimensions are not obtained due to shrinkage caused by cooling of the resin charged into the cavities in the injection process). Another reason is that the degree of shrinkage when the resin solidifies differs depending upon temperature.

A mold has been proposed in which the second runners are provided with two heaters (second and third heaters) the temperatures of which can be controlled independently [for example, see the specification of Japanese Patent Application Laid-Open (KOKAI) No. 63-236615]. However, even in this mold the resin used in order to balance the amount of resin charged into the cavities is merely part of the resin residing in the second runners. Since the molten resin residing in the plurality of first runners is maintained at a substantially uniform temperature by the common heater, the fluidity of the resin at these portions is substantially uniform. Therefore, the amount of resin fill is substantially governed by the temperature of the resin in the second runners and it is difficult to balance the amount of fill. If the temperature difference between first and second runners is enlarged in order to balance the amount of fill, the molded articles will develop a variance in terms of dimensions and weight, as set forth above.

Furthermore, in a case where the amount of resin which collects in the second runners is not enough resin necessary for a single molding operation, all of the resin that has collected in the second runners and some of the resin that has collected in the first runners is charged into the cavities. Therefore, if there is a difference in temperature between the second runners and the first runners, then there is a difference in the degree of shrinkage at one part of a molded article from that at another part thereof and therefore the article develops a defect wherein its shape becomes distorted at solidifying.

SUMMARY OF THE INVENTION

Accordingly, an object of the present invention is to fill a plurality of cavities with resin uniformly while a difference in the temperature of the resin charged into the cavities is held to the minimum, and realize excellent gate finish and moldability, thereby making it possible to obtain high-quality molded articles in which there is little variance in the weight and dimensions of molded articles from one cavity to another.

According to the present invention, the foregoing object is attained by providing a multi-cavity mold apparatus, comprising a plurality of first runners branching from a single common channel, a plurality of second runners each having two ends, wherein one end leads to a terminus of a respective one of the first runners and the other end serves as a gate facing a corresponding cavity, independently controllable temperature regulating means for flow-distribution adjustment provided for respective ones of the first runners, and independently controllable temperature regulating means for gate finish adjustment provided for respective ones of the second runners.

In a preferred embodiment of the invention, the first runner holds resin necessary for at least one molding operation and preferably an integral number of molding operations. Further, the second runners have a flow passage sectional area that is less than a flow passage sectional area of the first runners.

In another preferred embodiment of the invention, pressure loss in the second runner is equal to or greater than pressure loss in the first runner.

In still another preferred embodiment of the invention, independently controllable temperature regulating means for flow-distribution adjustment are further provided for respective ones of the second runners.

Further, the present invention provides a method of controlling the temperature of the above-described multi-cavity mold apparatus. The method comprises the steps of regulating the temperature of the first runners by the temperature regulating means for flow-distribution adjustment in such a manner that the amount of resin with which the cavities are filled is rendered substantially uniform, and regulating the temperature of the second runners by the regulating means for gate finish adjustment in such a manner that gate finish is improved.

More specifically, the control of temperature of the first runners involves regulating the temperature of the first runners by the temperature regulating means for flow-distribution adjustment in such a manner that the molded articles produced from the cavities will be substantially equal in weight or of equal dimensions.

Further, the present invention provides an automatic temperature control unit for the above-described multi-cavity mold apparatus. The temperature control unit comprises means for measuring amount of resin with which each of a plurality of cavities is filled, first control means for controlling the temperature regulating means for flow-distribution adjustment in such a manner that the amount of resin fill measured by the measuring means will be substantially uniform for the plurality of cavities, means for discriminating gate finish, and second control means for controlling the corresponding regulating means for gate finish adjustment in such a manner that a gate finish defect will not be discriminated by the means for discriminating gate finish.

According to the present invention, temperature regulating means (heaters and cooling channels) for adjusting the amount of resin with which the plurality of cavities are filled and temperature regulating means (heaters and cooling channels) for adjusting gate finish and moldability are separately provided. That is, control is performed in such a manner that the amount of resin with which the plurality of cavities are filled is rendered substantially uniform or equal by providing independently controllable temperature regulating means (wherein at least the heaters are independently controllable), which are for adjusting the distribution of resin flow to the cavities, for respective ones of the first runners (main runners) within the multi-cavity mold. Further, it is so arranged that the first runner holds the resin necessary for at least one molding operation. As a result, uniform filling is achieved with a small temperature differential. Furthermore, by making the flow passage sectional area of the second runners smaller than that of the first runners, or by making the pressure loss in the second runners equal to or greater than that in the first runners, only the resin that is temperature regulated for the sake of flow distribution in the first runners will pass through the second runners, in which the fluidic resistance is dominant, during the process in which the resin flows into the cavities. This means that the resin is charged into the cavities with much greater uniformity. On the hand, the second runners (the sub-runners) are each provided with independently controllable temperature regulating means to realize excellent gate finish and moldability. Thus, in accordance with the invention, it is possible to obtain high-quality molded articles in which there is little variance in the weight and dimensions of molded articles from one cavity to another.

The invention further provides a manifold block through which uniform filling of cavities with resin can be achieved. The manifold block comprises a plurality of runners branching from a single common channel and each capable of holding resin necessary for at least one molding operation, and independently controllable temperature regulating means provided for respective ones of the runners.

Further, the invention provides a method of uniformalizing the amount of resin with which a plurality of cavities are filled using a multi-cavity mold that includes such a manifold block. The method comprises the steps of performing molding using a multi-cavity mold that includes the aforementioned manifold block, raising the temperature of runners, by the temperature regulating means provided therefor, which correspond to cavities that produce molded articles having a relatively small amount of resin, and lowering the temperature of runners, by the temperature regulating means provided therefor, which correspond to cavities that produce molded articles having a relatively large amount of resin.

Thus, in accordance with the invention, it is possible to achieve greater uniformity and equality in the amount of resin charged into a plurality of cavities of a multi-cavity mold.

A multi-cavity mold apparatus according to the present invention comprises a plurality of first runners branching from a single common channel, and a plurality of second runners each having two ends, wherein one end leads to a terminus of a respective one of the first runners and the other end serves as a gate facing a corresponding cavity, the first runner having a capacity capable of holding resin necessary for at least one molding operation, and shapes of the first and second runner being so determined that pressure loss in the second runners is equal to or greater than pressure loss in the first runner.

In a preferred embodiment of the invention, the first runner possesses a capacity capable of holding resin necessary for an integral number of molding operations. The capacity of the first runner is adjusted through one of at least dieter and length of the first runner.

In order to control flow distribution, each of the first runners is provided with independently controllable temperature regulating means for adjusting flow distribution. In order to control gate finish, each of the second runners is provided with independently controllable temperature regulating means for adjusting gate finish. Each of the second runners may also be provided with independently controllable temperature regulating means for adjusting flow distribution.

Further, the pressure loss in the first runners and the pressure loss in the second runners are determined in such a manner that the sum of the pressure losses produced in a mold which includes pressure loss in the first runners and pressure loss in the second runner and pressure loss at a molding-machine nozzle will be less than a maximum allowable injection pressure of an injection molding machine employing the mold.

In accordance with the invention, in a mold which has a plurality of first runners and second runners leading to respective ones of these first runners, the first runners are provided with independently controllable temperature regulating means for adjusting flow distribution, and the first runner possesses enough capacity for holding the resin necessary for at least one molding operation. Therefore, the resin residing in the first runners is capable of having its temperature controlled over the time of at least one cycle. This makes it possible to perform effective temperature control for flow distribution. In addition, since pressure loss in the second runner becomes equal to or greater than the pressure loss in the first runner, the flow distribution by temperature control in the first runners can be achieved more effectively. The temperature differential of the resin charged into the cavities can be minimized and the cavities can be filled with the resin uniformly. This makes it possible to mold articles that are uniform in shape.

Furthermore, since the pressure loss in the second runner is equal to or greater than the pressure loss in the first runner, the self-controllability possessed by the second runners manifests itself effectively. Thus the system is strongly resistant to external disturbances such as fluctuations in temperature.

By providing the second runners of the comparatively large pressure loss downstream of the first runners, the resin is heated instantaneously by shear heating before it flows into the cavities. As a result, the resin experiences almost no heat deterioration and the temperature of the resin flowing into the cavities can be raised substantially. Consequently, the fluidity of the resin is increased and the pressure loss in the cavities declines, thereby making low-pressure molding feasible. This in turn enables the size (clamping force) of the molding machine used to be reduced or makes it possible to increase the number of molded articles that can be produced at one time. These advantages lead to higher productivity and lower cost.

The present invention further provides a method of fabricating the above-described mold. Specifically, in order to fabricate a mold having main runners, sub-runners leading to the main runners and cavities leading to gates at distal ends of respective sub-runners, the method of the invention comprises the steps of setting molding conditions inclusive of cavity flow-in resin temperature $T_{CAV}$ based upon capabilities of the molding machine, number of molded articles molded at one time and physical, thermal and rheological properties of the resin used, setting main-runner flow-in resin temperature $T_{MAIN-IN}$ to a temperature region in which heat deterioration of the resin will not occur, deciding main-runner shape in such a manner that the main runner will hold resin necessary for at least one molding operation, calculating an incremental temperature rise $\Delta T_{MAIN}$, which is due to shear heating in the main runner, based upon the main-runner shape decided, setting sub-runner shape in such a manner that an incremental temperature rise $\Delta T_{SUB}$, which is due to shear heating in the sub-runner, satisfies the relation $\Delta T_{SUB} = T_{CAV} - T_{MAIN-IN} - \Delta T_{MAIN}$, calculating pressure losses in the main runner and sub-runner based upon the shapes of the main runner and sub-runner decided, and determining whether the ratio of sub-runner pressure loss to main-runner pressure loss is equal to or greater than one.

It is determined whether the sum of the pressure losses produced in a mold which includes main-runner pressure loss and sub-runner pressure loss and pressure loss at a molding-machine nozzle will be less than a maximum allowable injection pressure of an injection molding machine employing the mold.

In a case where the pressure-loss ratio is less than one, or in a case where the sum of the pressure loses exceeds the maximum allowable injection pressure of the molding machine, at least the main runners or sub-runners or both are altered in shape. The alteration of runner shape can be carried out by changing either the runner diameter or length or both.

With a mold fabricated in accordance with the method of the invention, a difference in the temperature of the resin charged into the cavities can be minimized so that a uniform filling operation can be achieved. In addition, low-pressure molding can be realized without the resin experiencing heat deterioration.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS (1) Construction of multi-cavity mold

FIGS. 1 through 4 are diagrams schematically illustrating the hot runners (hot-runner block) and peripherally (internally) provided heaters of a multi-cavity mold apparatus according to embodiments of the present invention. It goes without saying that the shape of the hot runners is not limited to that illustrated. The heaters may be arranged in the hot runners in rod-like, rectangular, helical, zig-zag or any other form. It should be understood that the purpose of the drawings is not to define the shapes of the heaters but to clarify to which portions of the hot runners the heaters correspond.

Figure 1:
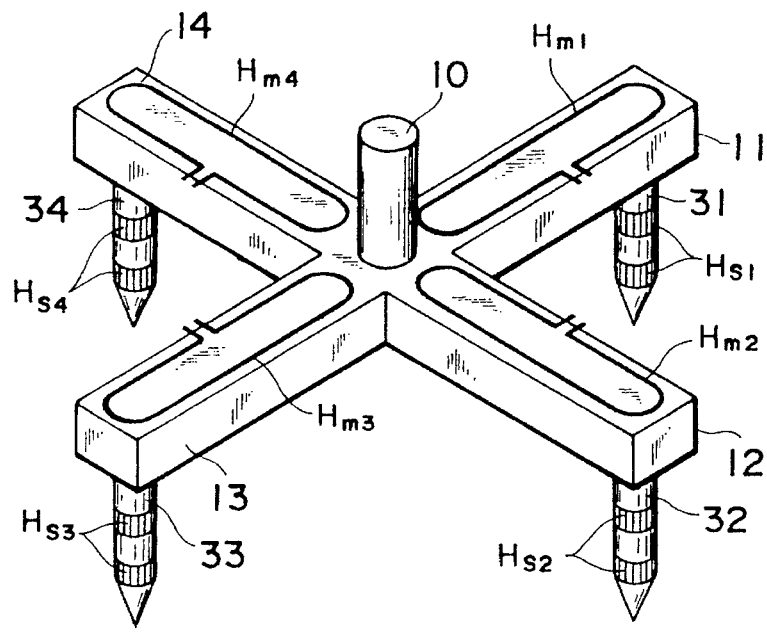
FIG. 1 is a perspective view of a hot-runner block schematically illustrating hot runners as well as heaters provided on the periphery thereof in a multi-cavity mold apparatus according to an embodiment of the present invention.
Figure 2:
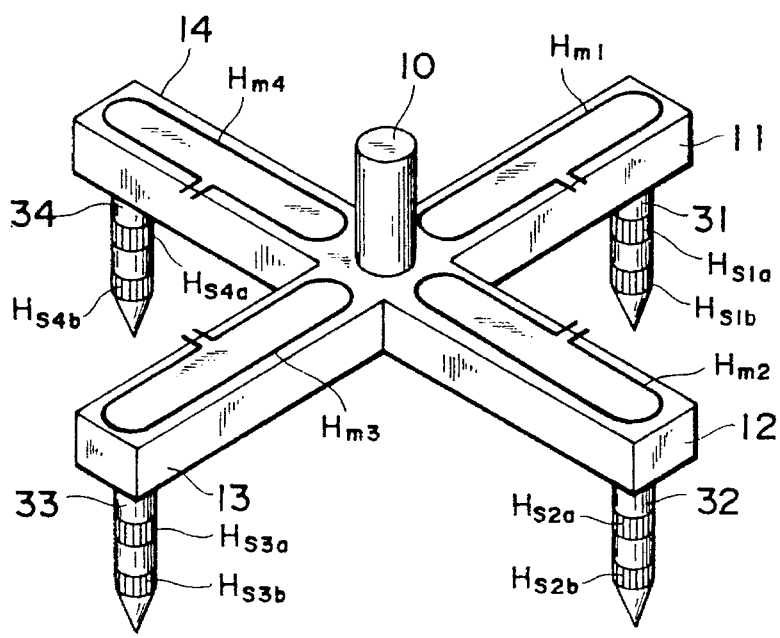
FIG. 2 is a perspective view of a hot-runner block schematically illustrating hot runners as well as heaters provided on the periphery thereof in a multi-cavity mold apparatus according to another embodiment of the present invention.

FIGS. 1 and 2 illustrate X-type hot runners. The arrangement shown in FIG. 1 will be described first.

Four main runners (first runners) 11, 12, 13 and 14 branch radially outward from a common channel 10 which leads to a molten-resin injection port of an injection molding machine. The overall configuration of the main runners 11~14 resembles the alphabetic character X, hense the "X-type" appellation. It goes without saying that the number of main runners branching from the common channel 10 is not limited to four; two, three or five or more main runners may be provided.

Sub-runners (second runners) 31, 32, 33 and 34 lead to the distal ends of the main runners 11, 12, 13 and 14, respectively, and extend toward corresponding cavities (not shown). The sub-runners 31~34 communicate with the corresponding cavities at their top ends which serve as gates.

The main runners 11~14 possess a capacity capable of holding the molten resin necessary for at least one molding operation, and preferably an integral number of molding operations. More specifically, at least one molded article is capable of being molded by the molten resin residing in the main runners. In a case where a molded article is molded by filling one cavity with the resin from one gate, one main runner will hold the resin necessary for the molding of at least one molded article. In case of a multi-gate, in which one cavity is filled with resin from a plurality of gates, the total amount of resin held by the main runners would be the amount of resin necessary for molding at least one molded article. Further, the passage cross section of the sub-runners 31~34 is smaller than that of the main runners 11~14. More specifically, it is so arranged that the pressure loss in the sub-runner will be equal to or greater than the pressure loss in the main runner, as will be set forth later.

The main runners 11, 12, 13 and 14 are provided with corresponding mutually independent heaters Hm1, Hm2, Hm3 and Hm4 for adjusting flow distribution. The heaters Hm1, Hm2, Hm3 and Hm4 are capable of having their temperatures controlled independently of one another.

Similarly, the sub-runners 31, 32, 33 and 34 are provided with corresponding mutually independent heaters Hs1, Hs2, Hs3 and Hs4 for adjusting gate finish. The heaters Hs1, Hs2, Hs3 and Hs4 are capable of having their temperatures controlled independently of one another. Though the illustrated arrangement is such that each sub-runner is provided with heaters at two separate locations, it goes without saying that the heaters for adjusting gate finish may be provided at one location on each sub-runner.

As will be described in detail later, the heaters Hm1~Hm4 of the main runner 11~14 adjust the distribution of the molten resin so that the corresponding cavities will be filled with the molten resin in an appropriately balanced manner, as a result of which the molded articles exhibit little variance in weight and dimensions from one to another. The heaters Hs1~Hs4 of the sub-runners 31~34 are used in order to enhance gate finish (i.e., suppression of high gate, strings, etc.) and moldability (drooling prevention, etc.).

In the embodiment shown in FIG. 2, the sub-runners 31~34 are provided with two types of mutually independent heaters Hs1a~Hs4a and Hs1b~Hs4b, respectively. The heaters Hs1a~Hs4a are for adjusting flow distribution, and the heaters Hs1b~Hs4b are for adjusting gate finish. The flow-distribution adjusting heaters Hs1a, Hs2s, Hs3a, Hs4a are capable of being controlled mutually independently, and the gate finish adjusting heaters Hs1b, Hs2b, Hs3b, Hs4b also are capable of being controlled mutually independently. Furthermore, the heaters Hs1a, Hs1b provided on the sub-runner 31 are controllable independently of each other. Similarly, the heaters Hs2a, Hs2b; Hs3a, Hs3b; Hs4a, Hs4b are controllable independently of each other. As will be set forth later, the flow-distribution adjusting heater Hm1 of main runner 11 and the flow-distribution adjusting heater Hs1a of the corresponding sub-runner 31 may be controlled together in order to adjust the flow distribution. The same holds for the flow-distribution adjusting heaters of the other main runners and the flow-distribution adjusting heaters of the corresponding sub-runners. The arrangement of FIG. 2 is the same as that of FIG. 1 in all other aspects.

Figure 3:
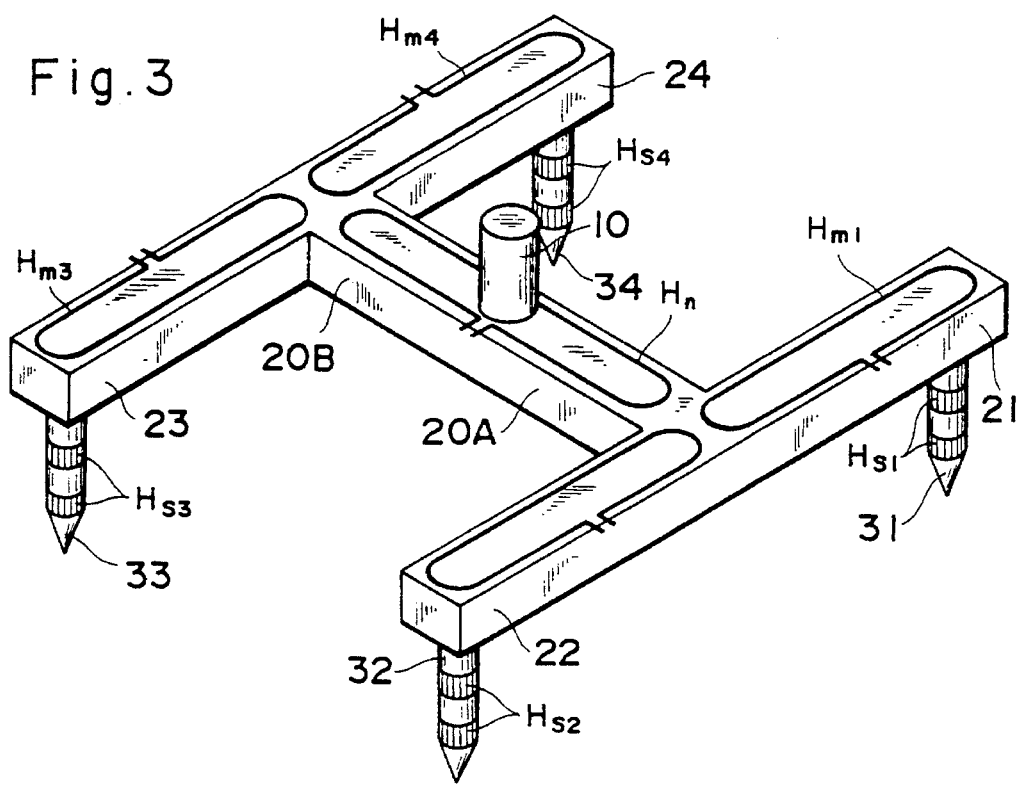
FIG. 3 is a perspective view of a hot-runner block schematically illustrating hot runners as well as heaters provided on the periphery thereof in a multi-cavity mold apparatus according to a still another embodiment of the present invention.
Figure 4:
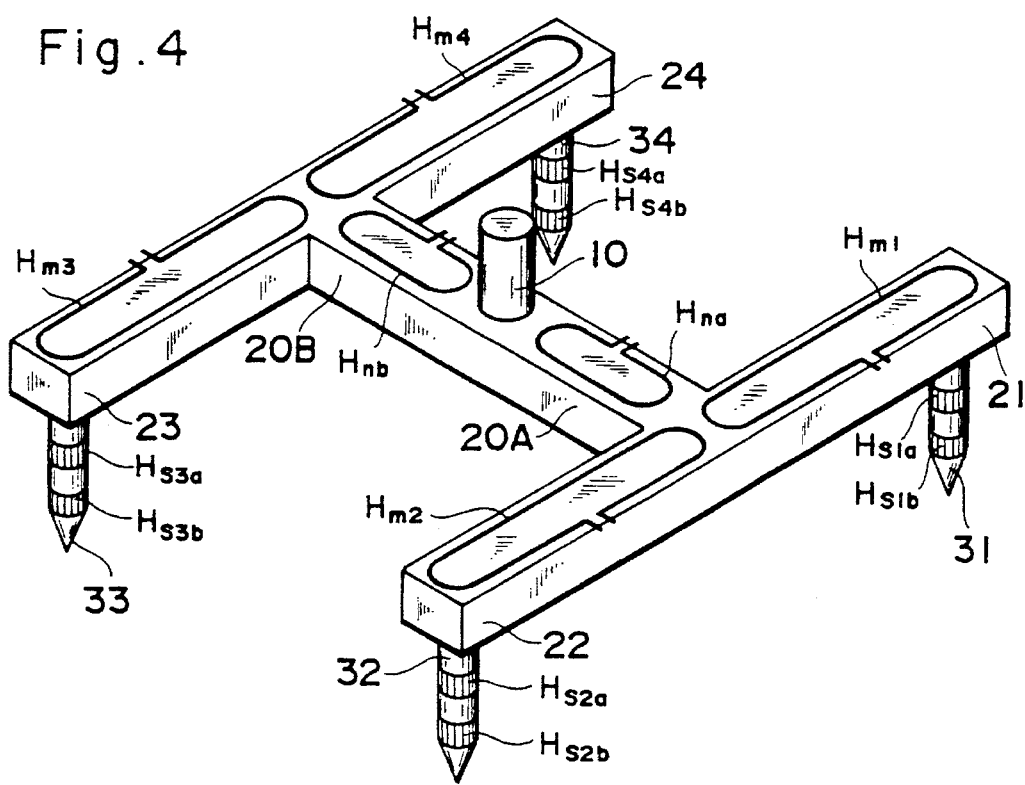
FIG. 4 is a perspective view of a hot-runner block schematically illustrating hot runners as well as heaters provided on the periphery thereof in a multi-cavity mold apparatus according to a still further embodiment of the present invention.

FIGS. 3 and 4 illustrate H-type hot runners. The arrangement shown in FIG. 3 will be described first.

Two first main runners 20A and 20B branch from the common channel 10, two second main runners 21 and 22 branch from the first main runner 20A, and two second main runners 23 and 24 branch from the first main runner 20B. The overall configuration of the flow passageways constituted by the main runners 20A, 20B and 21~24 resembles the alphabetic character H, hence the "H-type" appellation. It goes without saying that the number of first main runners branching from the common channel 10 may be three or more, and that the number of second main runners branching from the each of the first main runners may be three or more.

The sub-runners 31~34 lead to the distal ends of the second main runners 21~24, respectively.

The first main runners 20A and 20B are provided with a common heat maintaining heater Hn. The flow-distribution adjusting heaters Hm1~Hm4 capable of being controlled independently of each other are provided on the second main runners 21~24, respectively, and the gate finish adjusting heaters Hs1~Hs4 capable of being controlled independently of each other are provided on the sub-runners 31~34, respectively. This is the same as in FIG. 1.

The second main runners 21~24 possess a capacity capable of holding the molten resin necessary for at least one molding operation, and preferably an integral number of molding operations. Further, the passage cross section of the sub-runners 31~34 is smaller than that of the first main runners 21A, 21B and second main runners 21~24. Preferably, the pressure loss in the sub-runners is equal to or greater than the pressure loss in the main runners.

In the embodiment illustrated in FIG. 4, the first main runners 20A and 20B are respectively provided with heaters Hna and Hnb capable of being controlled independently of each other. The heaters Hna and Hnb serve to maintain the temperature of the molten resin residing in the first main runners 20A and 20B, and to assist in the flow-distribution adjustment of the molten resin.

Just as in the arrangement shown in FIG. 2, the sub-runners 31~34 are respectively provided with the independently controllable flow-distribution adjusting heaters Hs1a~Hs4a and the independently controllable gate finish adjusting heaters Hs1b~Hs4b. In other aspects the arrangement is the same as that illustrated in FIG. 3.

Figure 5:
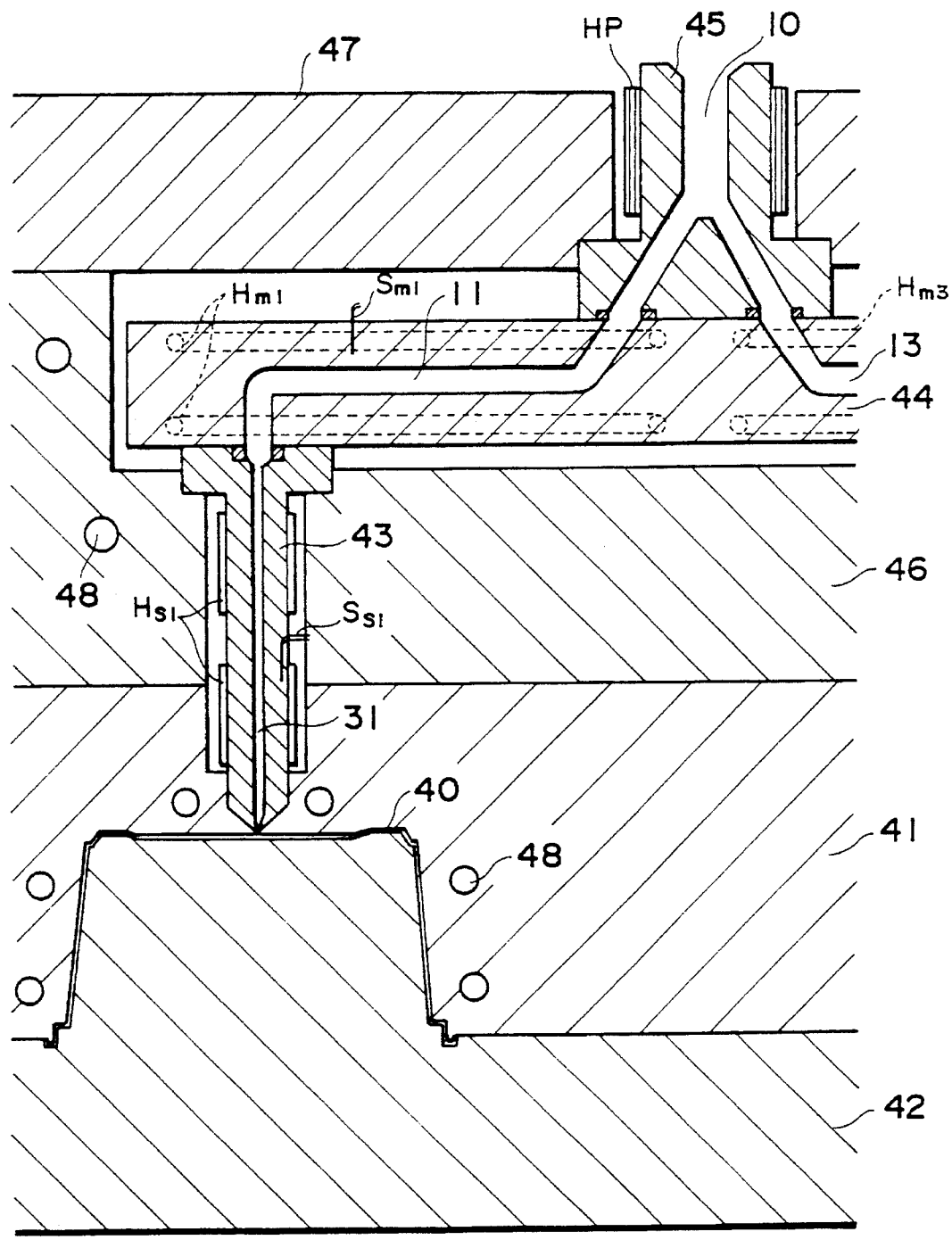
FIG. 5 is a sectional view showing in detail part of a multi-cavity mold apparatus according to an embodiment of the present invention.

FIG. 5 is a sectional view showing a specific example of the X-type mold apparatus schematically illustrated in FIG. 1; this is a sectional view showing part of the mold apparatus.

A cavity 40 is formed at the interface of two separable molds (split molds) 41 and 42. The hot runners are formed by a sprue block 45, a manifold block 44 and a sub-runner block 43. The sprue block 45 is formed to having a sprue 10 serving as the common channel. The inlet side of the sprue 10 is connected to the resin injection outlet of an injection molding machine. The sprue 10 branches into a plurality of resin passageways. The manifold block 44 is formed to have the main runners 11~14 (only the main runner 11 is shown). It goes without saying that an arrangement may be adopted in which the main runners 11~14 from the common channel 10 branch within the manifold 44. The sub-runner block 43 is formed to have the sub-runner 31. It goes without saying that four of the sub-runner blocks 43 are provided and are formed to have the sub-runners 31~34, respectively. The sprue block 45, manifold block 44 and sub-runner block 43 are joined via metal seals, whereby the sprue 10, main runner 11 and sub-runner 31 are communicated with one another to form one hot runner. The sub-runner 31 leads to the cavity 40 through the gate an its end.

The sprue block 45 is provided with a sprue heater HP so that the molten resin within the sprue 10 is heated or maintained in temperature. A thermocouple (not shown) is provided in order to measure the temperature of the sprue. As described above, the heaters Hm1~Hm4 capable of being controlled independently of one another are provided, within the manifold block 44, for respective ones of the main runners 11~14 formed in the manifold block 44. Thermocouples Sm1, Sm2, Sm3 and Sm4 (only the thermocouple Sm1 is shown) are provided in order to measure the temperature of portions of the manifold block 44 corresponding to,the main runners 11, 12, 13 and 14. The heaters Hs1~Hs4 are provided about the periphery of respective ones of the sub-runner blocks 43. In order to measure the temperature of portions of the sub-runner block 43 corresponding to the sub-runners 31, 32, 33 and 34, the sub-runner blocks have respective ones of thermocouples Ss1, Ss2, Ss3 and Ss4 (only thermocouple Ss1 is shown) attached thereto.

The sprue block 45, manifold block 44 and sub-runner block 43 are held by holding blocks 46, 47. The holding blocks 46, 47 and the mold 41 are joined into a whole by a fastener (not shown). As in an ordinary mold apparatus, the molds 41, 42 and the holding block 46 are provided with cooling channels 48, and the mold 42 is provided with an ejector pin (not shown) for extracting the molded article and with cooling channels, not shown.

(2) Mold temperature control

Next, a method of setting or changing the heater temperatures of the hot runners (main runner and sub-runners) will be described, taking the mold apparatus of FIG. 1 as an example.

Figure 6:
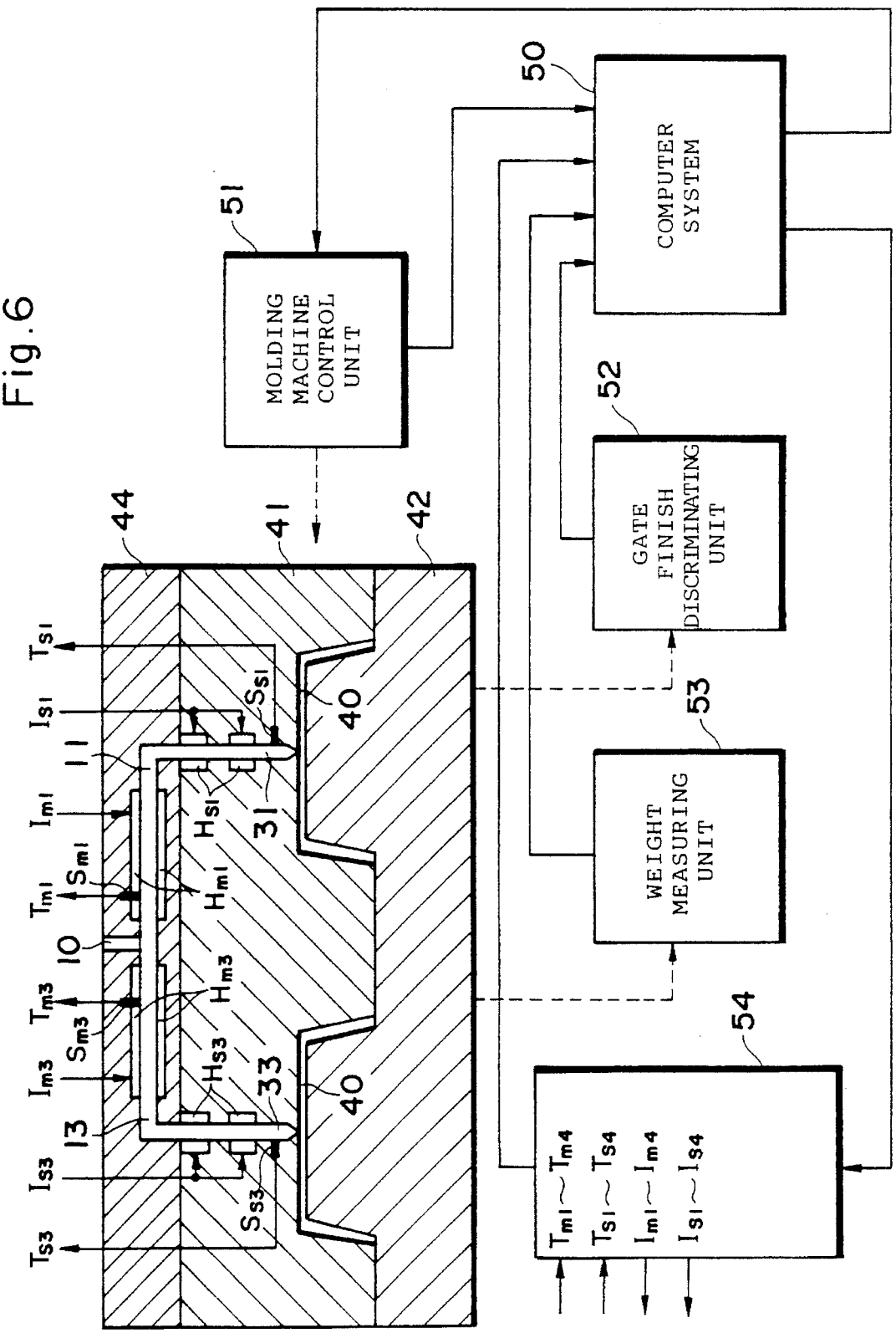
FIG. 6 is a block diagram showing the overall construction of a system which performs processing for setting and changing the heater temperature of the hot runners.

FIG. 6 illustrates generally the construction of an overall system which executes processing for setting and changing the heater temperatures of the hot runners.

In FIG. 6, in which the mold apparatus is illustrated schematically, the only elements illustrated are the common channel 10, the main runners 11, 13, the sub-runners 31, 33, the heaters Hm1, Hm3 and the thermocouples Sm1, Sm3 of the main runners, as well as the heaters Hs1, Hs3 and the thermocouples Ss1, Ss3 of the sub-runners. The common channel 10 and the main runners 11~14 are depicted as being formed in the manifold block 44. Currents which flow into the heaters Hm1~Hm4 of the main runners are represented by Im1~Im4, temperatures of the main runners measured by the thermocouples Sm1~Sm4 are represented by Tm1~Tm4, currents which flow into the heaters Hs1~Hs4 of the sub-runners are represented by Is1~Is4, and temperatures of the sub-runner block 43 measured by the thermocouples Ss1~Ss4 are represented by Ts1~Ts4.

A molding machine control unit 51, which controls the overall operation of injection molding by an injection molding machine, is for setting and changing shot size, dwelling pressure and dwelling time with regard to the setting and changing processing.

A gate finish discriminating unit 52 discriminates the acceptability (absence or presence of drooling, etc.) of moldability, and discriminates the gate finish (the absence or presence of high gate, strings, etc.). The gate finish discriminating unit 52, which includes a photodetector for irradiating with light the sub-runner gate portion or a portion contiguous to the gate of the molded article, determines whether drooling or strings is present based upon a detection output signal from the photodetector. Alternatively, the gate finish discriminating unit 52, which includes an image pick-up device for picking up the image of the sub-runner gate portion or a portion contiguous to the gate of the molded article, as well as a processor for applying image processing to image data obtained from the image pick-up device, determines whether drooling, high gate and strings are present based upon the results of image processing.

A weight measuring unit 53 is for measuring individually the weights of the plurality of molded articles obtained from the multi-cavity mold apparatus. An arrangement may be adopted in which the dimensions of the molded articles are measured by the unit 53.

A resin-temperature control unit 54 sets and changes the heater temperatures of the hot runners and controls the heaters Hm1~Hm4 and Hs1~Hs4. The control unit 54 is provided with target temperatures for the main runners 11~14 and sub-runners 31~34, which enter from a computer system 50 or as the result of a manual setting (or change), and with signals indicative of measured temperature from the thermocouples Sm1~ Sm4, Ss1~Ss4. The control unit 54 compares the target temperatures with the corresponding measured temperatures and controls the currents Im1~Im4, Is1~ Is4, which flow into the heaters Hm1~Hm4, Hs1~Hs4, in such a manner that the errors between the compared values approach zero. Though not shown, it goes without saying that a control unit for controlling the circulation and temperature of the coolant which flows through the mold is provided.

The computer system 50 is provided with signals indicative of shot size, dwell and dwelling time set by the molding machine control unit 51, the acceptability of moldability and the gate finish discriminated by the gate finish discriminating unit 52, the weights (and dimensions) of the molded articles measured by the weight measuring unin 53, and the resin temperature measured by the resin-temperature control unit 54. In accordance with processing described later, the computer system 50 uses these data to decide shot size and dwell, commands the molding machine control unit 51 to abide by the newly decided shot size and dwell, decides the hot-runner block temperature of each hot runner in the multi-cavity mold apparatus, and commands the resin-temperature control unit 54 to adopt these temperatures as the target temperatures, thereby executing processing to set and/or change the hot-runner heater temperatures.

FIGS. 7 through 10 illustrate the procedure of processing for setting and changing hot-runner heater temperature.

This processing is executed in various modes. Most ideally, all processing from initial setting to judgment of acceptability of moldability, gate finish and acceptability of molded articles and changes in shot size, dwell and resin temperature would be performed automatically under the control of the computer system 50 using the system shown in FIG. 6. On the other hand, the mode in which automation is slowest is that in which all of the illustrated processing is performed by a technician (a human being). Examples of modes intermediate these two extremes would be one in which only the various calculation processing steps are executed by the computer system while the settings, judgments and changes in set values are performed by a human being; one in which the various calculation processing steps and changes in set values are performed by the computer system while other settings, judgments and the like are performed by a human being; and one in which the settings, calculation processing steps and changes in set values are performed by the computer system and only the judgments are made by a human being. Regardless of the mode, feedback temperature control for the various heaters would be carried out automatically by the resin-temperature control unit 54.

In the discussion to follow, Hmi is representative of the flow-distribution adjusting heaters Hm1~Hm4 of the main runners, Hsi is representative of the gate finish adjusting heaters Hs1~Hs4 of the sub-runners, Smi, Ssi are representative of the thermocouples Sm1~Sm4, Ss1~Ss4, respectively, Tmi, Tsi are representative of set temperatures Tm1~Tm4, Ts1~Ts4, respectively, and Imi, Isi are representative of currents Im1~Im4, Is1~Is4. Here i=1~n holds, so that n=4 holds in FIG. 1. Owing to the fact that the temperature of the hot runner block is controlled by the resin-temperature control unit 54 in such a manner that the measured temperatures and the target temperatures will become equal, the measured temperatures and target temperatures will be represented using the same symbols Tmi (main runner), Tsi (sub-runner) as long as there is no confusion.

Figure 7:
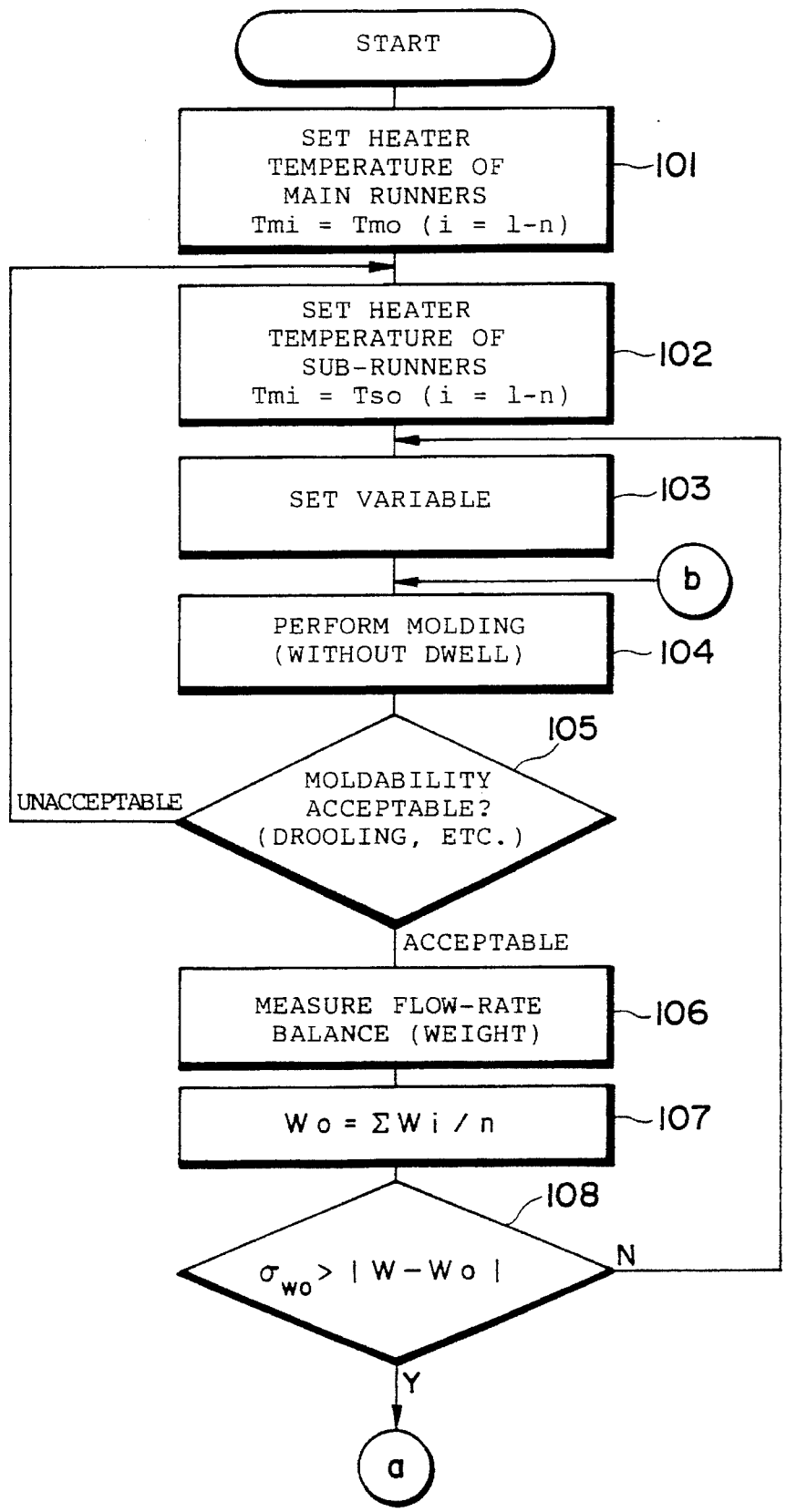
FIG. 7 is a flowchart showing the procedure of initial setting processing.

FIG. 7 illustrates the processing for initial setting.

First, a standard temperature Tmo is set (step 101) as the target temperature Tmi of the flow-distribution adjusting heater Hmi in the main runners 11~14. The target temperatures of all of the heaters Hm1~Hm4 are set at the same temperature Tmo. The standard temperature Tmo most generally is decided based upon the experience of the technician and therefore would be set manually using a setting device on the resin-temperature control unit 54. It is of course permissible to decide the standard temperature in the computer system 50 by a method described in the specification of Japanese Patent Application No. 3-356697, filed previously by the applicant, and set the temperature in the resin-temperature control unit 54 automatically by a command from the computer system. Though not shown, the temperature and flow rate, etc., of the coolant would also be set and controlled as required.

Similarly, the same standard temperature Tso is set (step 102) as a target temperature Tsi of all of the gate finish adjusting heaters Hs1~Hs4 in the sub-runners 31~34. The standard temperature Tso most generally is decided based upon the experience of the technician and therefore would be set manually using the setting device on the resin-temperature control unit 54. It is permissible also for this standard temperature to be set and inputted to the computer system 50, whence the corresponding command would be sent to the resin-temperature control unit 54.

Further, the shot size is set (step 103). Since a standard value for the shot size is determined in advance depending upon the size, etc., of the molded article (the cavity) or is determined based upon experience, the shot size is inputted to the injection molding machine directly or is set in the molding machine control unit 51 illustrated in FIG. 6.

Next, the injection molding machine is actuated to perform injection molding (step 104), from which a dwell step has been omitted. The injection molding process in an injection molding machine can be thought of as being divided into an injection step in which the cavities of the mold are filled with molten resin at high pressure, a dwell step in which, in order to prevent a situation wherein the desired shape is not obtained owing to the occurrence of a gap between the mold and the resin caused by contraction of the injected resin within the mold, after injection resin is supplied by applying a constant pressure, and a cooling step in which the resin is cooled down to a temperature at which the resin can be extracted from the mold without application of pressure. In the molding operation of step 104, a transition is made to the cooling state immediately following the injection step.

It is determined (step 105) whether moldability in the molding operation is acceptable or not. As set forth earlier, acceptability of moldability is determined by such factors as whether or not so-called "drooling" occurs due to an excessive rise in the temperature of the molten resin, and whether or not injection of the resin is made difficult by solidifying of the resin at the gate due to an excessively low resin temperature. If moldability is poor, the program returns to step 102, the temperatures of the heaters Hs1–Hs4 in the sub-runners 31–34 are adjusted and molding without dwell is attempted again.

If moldability is acceptable, the weights of the plurality of molded articles molded are measured by the weight measuring unit 53 or one at a time by a technician using a weighing device (step 106). Next, the average value Wo (=ΣWi/n) of the weights Wi (i=1–n) of the plurality of molded articles molded by a single injection of resin using the multi-cavity molding is calculated (step 107). This may be performed automatically by cooperative processing executed by the weight measuring unit 53 and computer system 50, or by manual calculation performed by the technician.

Next, it is determined (step 108) whether the absolute value of the difference between the average weight Wo of the molded articles and the weight target value (a value estimated from the past record of molding performance) falls within an allowable offset range $\sigma_{WO}$. This determination may be made by the computer system 50 or by the technician. If the absolute value |W−Wo| of the aforesaid difference lies within the allowable range, then the program proceeds to the processing of FIG. 8 for adjusting flow distribution; otherwise, the program returns to step 103, where the shot size is set again. After the resetting of the shot size, injection molding without dwell is performed again.

It goes without saying that injection molding without dwell (step 104) may be repeated even if moldability is found to be acceptable at step 105 and the average weight of the molded articles is found to lie within the allowable range at step 108, whereby the correctness of the judgments made at steps 105, 108 can be verified.

Figure 8:
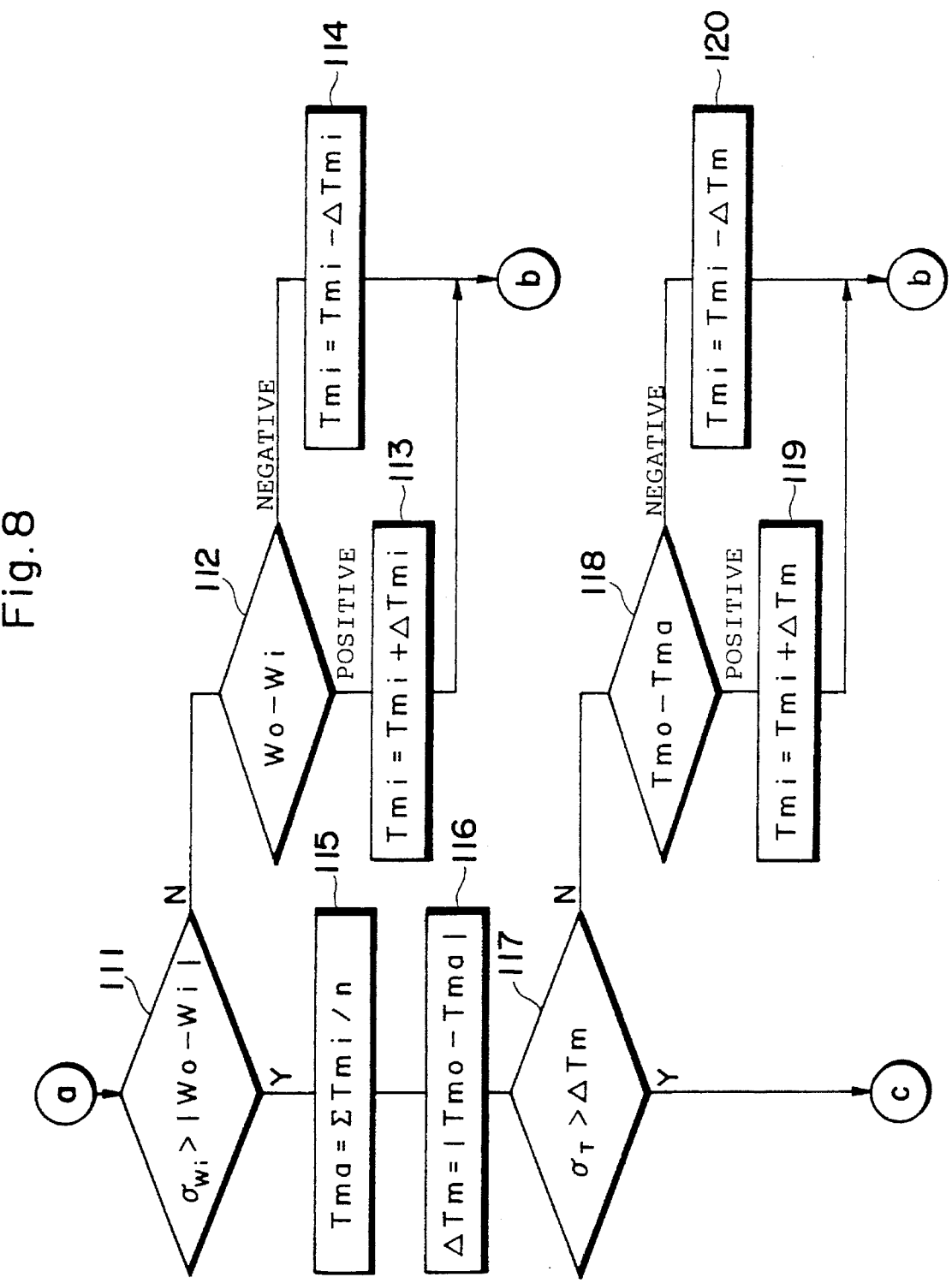
FIG. 8 is a flowchart showing the procedure of flow-distribution regulating processing in the absence of dwell.

FIG. 8 illustrates the processing for adjusting flow distribution carried out after the initial-setting processing (FIG. 7).

In order to determine whether the molten resin is being distributed equally to the plurality of cavities of the mold for multi-cavity molding in the injection molding operation without dwell, the degree of variance in the weights of the individual molded articles is judged. It is determined (step 111) whether the absolute value of the difference between the average weight Wo of the molded articles calculated at step 107 and the weight Wi of the individual molded articles is less than a standard value $\sigma_{Wi}$ of weight variance. This determination may be made by the computer system 50 or by the technician. If a YES decision is rendered at step 111 with regard to all of the molded-article weights Wi (i=1–n) [that is, if $\sigma_{Wi}$>|Wo−Wi| holds for all i (i=1–n)], then this means that the temperatures of the heaters of the main runners 11–14 have been properly set in order to obtain molded articles exhibiting little variance in weight from one article to the next. In other words, this means that the molten resin has been distributed substantially equally so that the amount of resin filling all of the cavities is substantially the same.

If a NO decision is rendered at step 111 with regard to the weight of any one of the molded articles, then it is determined (step 112) whether the difference Wo−Wi between the average weight Wo and the weight Wi of this molded article is positive or negative. In general, if the weight of a molded article is relatively light, the temperature is raised to increase the fluidity of the resin so that cavity will be filled with more resin. Conversely, if the weight of a molded article is relatively heavy, the temperature of the resin is lowered. Accordingly, if Wo−Wi is positive, the target temperature of the heater Hmi of whichever of the main runners 11–14 corresponds to this molded article is changed so as to rise slightly (step 113). If Wo−Wi is negative, the target temperature is lowered slightly (step 114). An arrangement may be adopted in which the positive-negative determination of step 112 and the change in the target temperature of the heater Hmi of main runners 11–14 based upon this determination is performed automatically by the computer system shown in FIG. 6, or in which the technician makes the positive-negative determination and manually changes the set temperature in the resin-temperature control unit 54. Thereafter, the program returns to step 104, at which injection molding without dwell is performed again. The manual operations or processing operations of steps 111–114, 104, etc. are repeated as necessary, whereby the variances in the weights of the plurality of molded articles molded by a single mold for multi-cavity molding will fall within the range of the standard $\sigma_{Wi}$.

When the variances in the weights of all molded articles thus fall within the range of the standard $\sigma_{Wi}$, the temperatures of all of the main runners 11–14 are investigated to determine whether they deviate greatly from the target temperature Tmo. At the aforesaid step 101, the target temperatures of all heaters Hmi were set to Tmo. However, since the target temperatures of the heaters Hmi have been adjusted individually by the processing of steps 112–114, there may be a large deviation from the standard temperature Tmo when the temperatures are viewed as a whole. Accordingly, the average value Tma (=ΣTmi/n) of the temperatures of all heaters Hmi of main runners 11–14 is calculated (step 115) and it is determined (step 117) whether the absolute value ΔTm of the difference between the standard temperature Tmo and the average temperature Tma is greater than an allowable range $\sigma_T$ of deviations in the set temperatures of the main runners. If $\sigma_T$>ΔTm holds, then the program proceeds to flow distribution adjustment under dwell shown in FIG. 9. However, if the inequality $\sigma_T$>ΔTm is not satisfied, then, depending upon whether Tmo−Tma is positive or negative, the target temperatures Tmi of all heaters Hmi are uniformly raised or lowered by a constant value ΔTm (steps 118, 119, 120) and the program returns to step 104 so that injection molding without dwell is carried out again. The processing steps and operations of steps 116–120 also may be performed automatically by the computer system 50 or manually by the technician.

Figure 9:
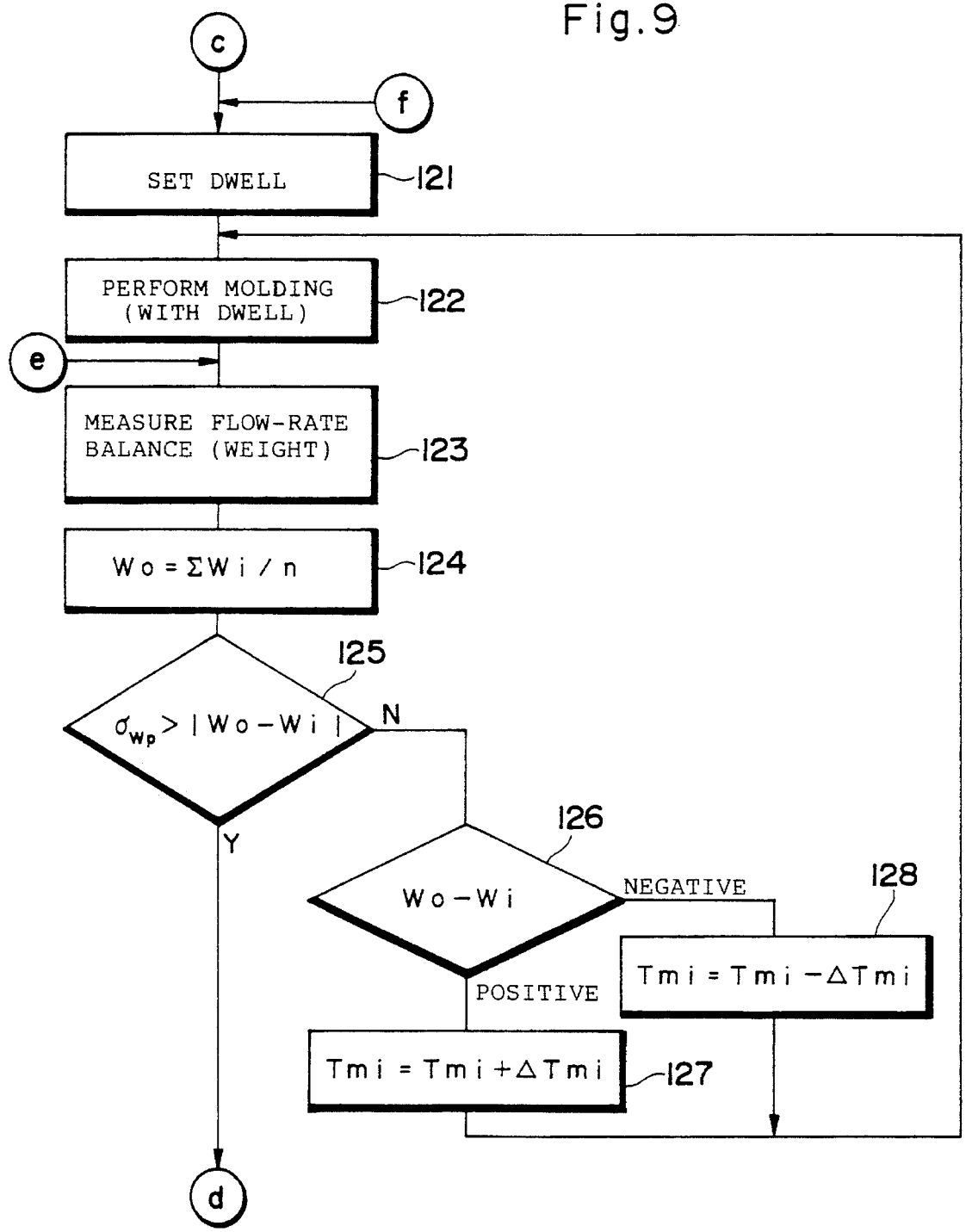
FIG. 9 is a flowchart showing the procedure of flow-distribution regulating processing in the presence of dwell.

The adjustment of flow distribution under dwell shown in FIG. 9 starts with the setting of dwelling time and pressure (step 121). The setting of dwell may be performed automatically by having the computer system 50 make a selection from values set in advance or manually by having the technician input a standard value based upon experience. Injection molding which includes a dwell step is then carried out. With regard to the plurality of molded articles obtained by injection molding inclusive of a dwell step, adjustment of the amount of resin charged into each of the cavities is performed by temperature adjustment of the heaters Hmi of main runners 11~14 in such a manner that the weights of the molded articles will be well balanced (steps 123~128). This processing is the same as that of steps 106, 107 shown in FIG. 7 and steps 111~114 shown in FIG. 8. Use is made of $\sigma_{wp}$ a standard value of variance in weight from one molded article to another.

In the processing illustrated in FIG. 9, an adjustment (which corresponds to steps 115~120 of FIG. 8) relating to the average temperature Tma of the heaters Hmi is not carried out. If necessary, however, this adjustment may also be performed. Furthermore, an arrangement can be adopted in which heater temperature is adjusted so as to obtain good balance in the dimensions of the molded articles and not just the weights thereof. This is the same in FIGS. 7 and 8.

When adjustment for balancing weight utilizing the heaters Hmi for adjusting the flow distribution of the main runners 11~14 ends for a plurality of molded articles obtained by injection molding under dwell, the gate finish is adjusted utilizing the heaters Hsi for adjusting gate finish of the sub-runners 31~34.

Figure 10:
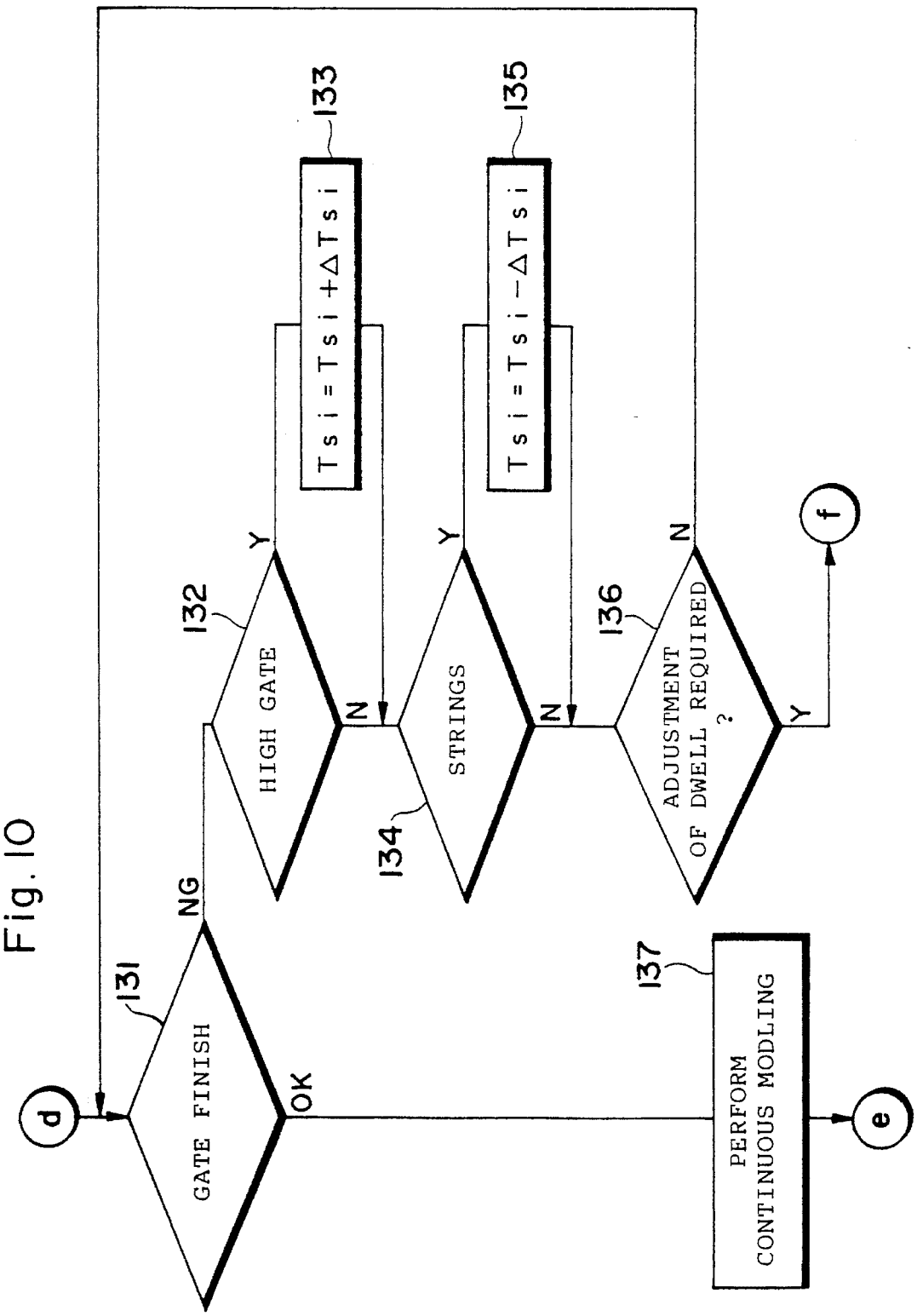
FIG. 10 is a flowchart showing the procedure of processing for regulating gate finish.

In FIG. 10, the gate finish of respective ones of the gates of all sub-runners 31~34 of the multi-cavity mold are checked (step 31). An example of a poor gate finish is high gate (step 132), in which the gate mark on a molded article becomes convex in shape owing to solidifying of resin at the gate portion when the temperature is too low, and strings (step 134), in which resin in the shape of a thread remains at the gate opening of the molded article when the temperature is too high. In the former case, the set temperature of the heater Hsi of the sub-runner having a gate at which high gate occurs is raised slightly (step 133). In the latter case, the set temperature of the heater Hsi of the sub-runner having lowered gate at which strings occurs is lowered slightly (step 135). The judgment of gate finish and the adjustment of the set temperature of the heaters Hsi for gate finish adjustment may be performed manually by the technician upon visual confirmation or automatically by cooperation among the gate finish discriminating unit 52, computer system 50 and resin-temperature control unit 54 shown in FIG. 6.

There are times when the gate finish cannot be adjusted solely by the gate finish adjusting heaters Hsi of the sub-runners 31~34, in which case adjustment of dwell is necessary (step 136). In such case, the program returns to step 121 and adjustment of dwell is carried out.

The examination and adjustment of gate finish are executed for all of the sub-runners 31~34.

When an "OK" decision has been rendered for all sub-runners 31~34, continuous molding is executed (step 137). The adjustment of flow distribution shown in FIG. 9 and the investigation of gate finish shown in FIG. 10 are performed in the same manner for the molded articles obtained from continuous molding. If satisfactory results are obtained for all sub-runners, then the entire adjustment operation ends.

Described thus far has been processing for setting and changing heater temperature in a case where use is made of a mold having the resin passageways and various heaters Hmi, Hsi configured as shown in FIG. 1. However, basically the same procedure is followed also with regard to the mold apparatus illustrated in FIGS. 2 through 4.

In the mold apparatus shown in FIGS. 2 and 4, the sub-runners 31~34 are provided with flow-distribution adjusting heaters Hsia and gate finish adjusting heaters Hsib. With regard to the flow-distribution adjusting heaters Hsia, either the setting and changing of temperature are performed at the same time as those of the flow-distribution adjusting heaters Hmi in the main runners 11~14 or the setting and changing of temperature are performed through the procedure of FIGS. 8 and 9 separately of the flow-distribution adjusting heaters Hmi in the main runners 11~14.

With regard to the temperature-maintaining heaters Hn in the mold apparatus shown in FIG. 3, it will suffice to set a predetermined standard temperature.

As for the flow-distribution assisting heaters Hna, Hnb serving also to maintain temperature in the mold apparatus shown in FIG. 4, a predetermined standard temperature may be set, or a temperature adjustment may be made through the same procedure at the same time as that of the flow-distribution adjusting heaters Hmi or separately thereof.

Finally, the data actually obtained are as shown in Table 1 below.

TABLE 1

| DETAILS | ITEM | i = 1 | i = 2 | i = 3 | i = 4 | COMMENTS |
| --- | --- | --- | --- | --- | --- | --- |
| NO FLOW DISTRIBUTION ADJUSTMENT NO DWELL | MAIN-RUNNER HEATER Hmi | 280° C. | 280° C. | 280° C. | 280° C. | |
| | SUB-RUNNER HEATER Hsi | 250° C. | 250° C. | 250° C. | 250° C. | |
| | WEIGHT | 28.3 g | 29.32 g | 27.62 g | 28.04 g | Av: 28.32 g |
| | SPECIFIC WEIGHT | 0.9993 | 1.0353 | 0.9753 | 0.9901 | −2.47%~+3.53% |
| FINAL MOLDED PRODUCT | MAIN-RUNNER HEATER Hmi | 275° C. | 285° C. | 277° C. | 285° C. | |
| | SUB-RUNNER HEATER Hsi | 270° C. | 270° C. | 270° C. | 270° C. | |
| | WEIGHT | 30.83 g | 30.98 g | 31.25 g | 30.80 g | Av: 30.97 |
| | SPECIFIC WEIGHT | 0.9956 | 1.0004 | 1.0092 | 0.9947 | −0.53%~+0.92% |

The data in the upper half of Table 1 are for a case in which the temperatures of the heaters Hmi for adjusting flow distribution have all been set equally. The dwell step is omitted. The data in the lower half of Table 1 indicate a case in which the temperatures of the heaters Hmi for adjusting flow distribution have been regulated so that the amounts of resin charged into all cavities will be set to be substantially uniform. In the case where the flow distribution is regulated, the variance in the specific gravity of the molded articles is reduced from −2.47−+3.53% to −0.53−+0.92% in comparison with the case in which no adjustment is made. It is true that the data in the upper half of Table 1 exhibit a large variance because the dwell step has been omitted, as mentioned earlier. However, even if the dwell step is included, the variance will be about −1.0−+2.0% if no adjustment of flow distribution is made, and therefore it will be understood that a major improvement is achieved. Further, since the temperature differential of the main-runner heaters Hmi is about 10° C. and the temperature response of the resin in the main runners is about 50%, the temperature differential of the resin which flows into the cavities is about 5° C., which is fairly small as far as resin flowing into the cavities is concerned. The temperature response referred to here is represented by [(Ts−Tin)/(Tm−Tin)]×100%, where Tin represents the initial temperature of the resin which has flowed into the main runners, Tm the set temperature of the main-runner heaters and Ts the resin temperature (within the main runners) following temperature control. The reason why the average weight of the data in the upper half of Table 1 is smaller than that of the data in the lower half of Table 1 is that dwell is not applied.

(3) Structure and fabrication of multi-cavity mold

As set forth above, a plurality of main runners are provided with respective ones of independently controllable heaters for controlling the temperatures of the main runners independently. As a result, even if the hot runners of the mold exhibit dimensional variance from one to another, it is possible to equally distribute the resin, i.e., to distribute the resin equally to the cavities which correspond to the main runners, while the temperature differential of the resin charged into the cavities is kept as small as possible.

It is preferred that the difference in the temperature of the resin from one cavity to another or from one gate to another be as small as possible. The reason is that since the degree of shrinkage when the resin solidifies differs depending upon the temperature, the molded articles will develop a variance in their dimensions if the temperature differential is too large. In a multi-cavity mold in which a plurality of main runners are provided with respective ones of independently controllable heaters, two basic structural requirements (A) and (B) of a mold for distributing resin as equally as possible with a resin temperature differential at cavity inflow that is as small as possible are as follows:

(A) The amount of resin held in the main runners should be made as large as possible.

In order to achieve equal distribution of resin to the cavities as mentioned above, a heater temperature that differs for each main runner or some main runners is set and the resin within the plurality of main runners is temperature-controlled independently for each main runner. In the injection step, however, the resin held at a constant temperature by a common heater (e.g., a manifold heater) provided upstream of the main runners flows into the plurality of main runners. Since the temperature of the resin which flows into the main runners generally differs from the temperature of the resin in the main runners temperature-controlled for the sake of flow distribution in each main runner, the resin which has flowed into the main runners impedes equal distribution. Accordingly, the smaller the influence of the resin which has flowed into the main runners upon resin in the main runners, i.e., the larger the amount of resin held within the main runners, the higher the degree of flow distribution. In addition, if the temperature of the amount of resin necessary for at least one molding operation (the amount of resin involved in a single injection shall be referred to as "one shot" of resin) is not made uniform, the temperature of the resin which flows into the cavities in the first half of the injection step will differ from that in the second half of the injection step. Therefore, the degree of shrinkage in one part of a molded article will differ from that in another part and the article will become distorted. In view of these points, it is required that the resin be made to reside in the main runners over a period greater than one molding cycle. The amount of resin held in the main runners is at least one shot and preferably a whole-number multiple of one shot.

(B) When the resin whose temperature is controlled in the main runners to make possible equal distribution is charged into the cavities through the sub-runners, the fluidity of the temperature-controlled resin should be sufficiently reflected in the sub-runners.

Since resin that has not been controlled in temperature for the sake of flow distribution flows in from the molding machine at the time of molding, the fluidic resistance of the resin in the main runners acts so as to lower the degree of flow distribution. This means that the fluidic resistance in the sub-runners should be made dominant. This requirement is expressed as follows:

$$\Delta P_{SUB} \geq \Delta P_{MAIN} \qquad \text{Eq. 1}$$

where $\Delta P_{MAIN}$ represents pressure loss in the main runner and $\Delta P_{SUB}$ represents pressure loss in the sub-runner.

By determining the shapes of the main runners and sub-runners in such a manner that the requirements (A) and (B) are satisfied, a mold having a structure which excels in the degree of flow distribution will be obtained.

First, the requirement (A) will be discussed quantitatively using calculated results while reference is made to FIGS. 13 and 14.

Figure 13:
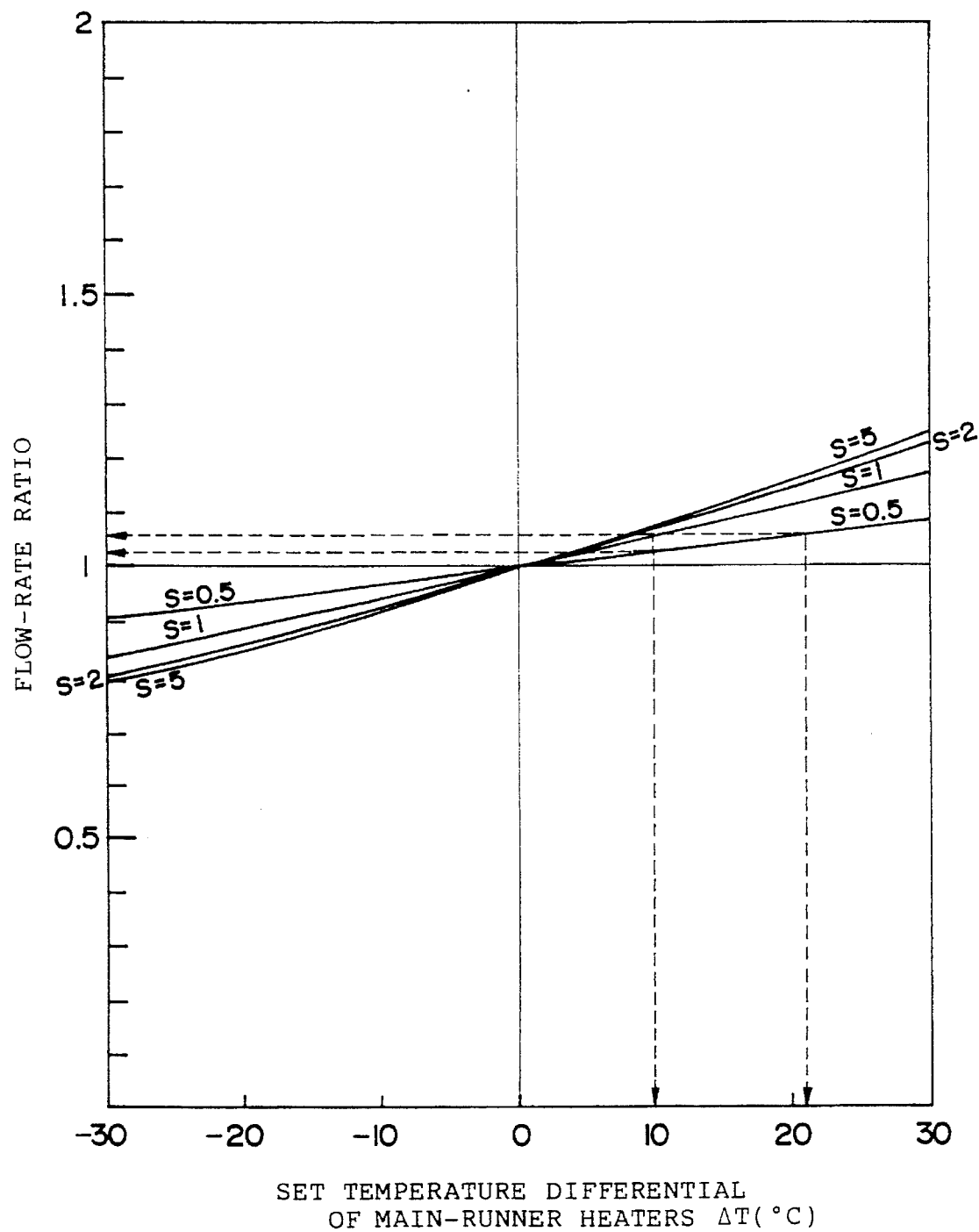
FIG. 13 is a graph showing the relationship between the temperature differential set for heaters of main runners and flow-rate ratio, wherein the capacity of the main runners is varied by changing main-runner diameter.
Figure 14:
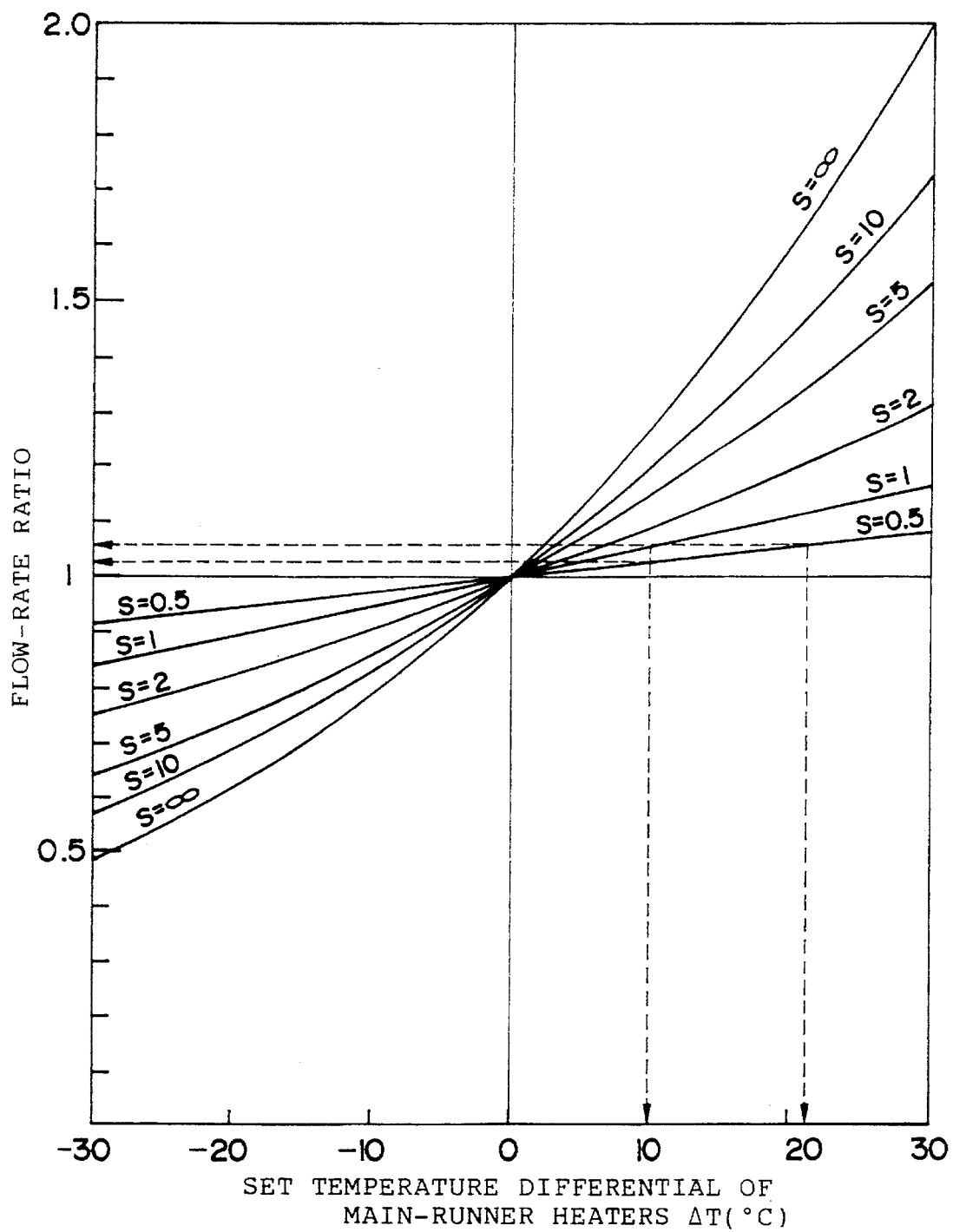
FIG. 14 is a graph showing the relationship between the temperature differential set for heaters of main runners and flow-rate ratio, wherein the capacity of the main runners is varied by changing main-runner length.

FIGS. 13 and 14 are graphs showing the results of calculating, as a parameter, an amount S of resin held in the main runners, in which a difference $\Delta T=Tm_1-Tm_2$ in the set temperatures of heaters provided in two respective main runners is plotted along the horizontal axis, and a ratio Q1/Q2 of flow rates in the two main runners corresponding to the temperature difference $\Delta T$ is plotted along the vertical axis. The amount S of resin held in the main runners is indicated with one shot serving as one unit. That is, S=1 means one shot of resin and S=2 means two shots of resin. The resin is polypropylene and the temperature response of the main runners is assumed to be 47% per cycle in the case where S=1 holds.

There are two methods available to change the amount of resin held in the main runners; one is to change the diameter (in a case where the cross section is circular) of the main runners and the other is to change the length of the main runners. In FIG. 13, at S≧1, the amount of resin held is varied by fixing main-runner length to that identical for a case S=1 holds and changing the main-runner diameter; at S<1, the amount of resin held is varied by making main-runner diameter identical with that for a case S=1 holds and changing the main-runner length. In FIG. 14, the amount of resin held is varied by fixing main-runner diameter to that identical for a case S=1 holds and changing the main-runner length.

Owing to a variance in the dimensions of the hot runners in a mold due to the fabrication process, the flow rate in two main runners will differ if resin at the same temperature is forced out of the main runners at the same pressure. Accordingly, it is required that the temperatures of the resin in the two main runners be given different values in order to equalize flow rate.

FIGS. 13 and 14 represent the degree to which flow rate varies when temperature differentials of various magnitudes are applied to two main runners. Here the presence of the sub-runners is not taken into account.

In the graphs of FIGS. 13 and 14, the greater the slope of the curve, the better the degree of flow distribution. For example, in a case where a set temperature differential of 10° C. is applied across two main runners, the flow-rate ratio becomes 1.06 when the amount of resin held is one shot (S=1), whereas the flow-rate ratio is 1.03 when the amount of resin held is 0.5 shot (S=0.5). This means that if the amount of resin held in the main runners is large, a high degree of flow distribution will manifest itself even at the same set temperature differential. Conversely speaking, in order to realize equal distribution of resin, a set temperature differential of 21° C. must be applied in case of main runners for which the amount of resin held is 0.5 shot if a flow-rate ratio of 1.06 is required. However, the temperature differential of 10° C. would suffice in case of main runners for which the amount of resin held is 1.0 shot.

A case in which the amount of resin held is varied by changing the diameter of the main runners will be considered with reference to FIG. 13. Residence time of the resin in the main runners is proportional to the square of main-runner diameter. On the other hand, temperature response is inversely proportional to the square of main-runner diameter. Accordingly, even if the amount of resin held is varied by varying the diameter of the main runners, there will be no change in the temperature response of the resin, which resides in the main runners, with regard to the temperature control applied. The fact that the temperature response of the resin which resides in the main runners is maintained constant irrespective of the change in the main-runner diameter means that the temperature of the resin which flows out of the main runners, namely the temperature of the resin which flows into the cavities, also is maintained constant (i.e., the influence of shear heating or the like in the main runners is negligible). This means that the set temperature differential of the heaters in the main runners and the temperature differential of the resin flowing into the cavities are in a substantially proportional relationship.

On the other hand, as set forth above, the larger the amount of resin held in the main runners, the higher the degree of flow distribution. For example, the curve of S=2 has a larger slope than the curve of S=1, and the curve of S=5 has a larger slope than the curve of S=2. The reason for this is as follows: The degree of flow distribution declines when resin, which has not been subjected to temperature control for the sake of flow distribution, is injected from the molding machine and flows into the main runners. However, the greater the amount of resin held in the main runners, the more the action which diminishes the degree of flow distribution can be suppressed.

In view of the foregoing, it will be understood that the greater the amount of resin held in the main runners, the more effectively flow can be distributed at a smaller temperature differential of the resin flowing into the cavities.

A case in which the amount of resin held is varied by changing the length of the main runners will be considered with reference to FIG. 14. A comparison of FIGS. 13 and 14 shows that for the same amount of resin held, the slope of the curve in FIG. 14 is greater than that illustrated in FIG. 13. This means that a greater change in flow rate is possible with a smaller set temperature differential for the heaters.

When main-runner length is enlarged while main-runner diameter is held constant, the temperature response of the resin is improved since the residence time of the resin in the main runners is lengthened. In the graph of FIG. 14, the slope of the curve is enlarged since the aforesaid effect of suppressing the action which diminishes the degree of flow distribution owing to inflow of the resin to the main runners is supplemented by the effect in which the greater the amount of resin held, the more residence time is lengthened and the more the temperature response of the resin is improved. It will be understood that increasing the amount of resin held by lengthening the main runners is more effective in order to achieve uniform filling at a smaller set temperature differential for the heaters.

Next, the requirement (B) will be discussed quantitatively using calculated results while reference is made to FIG. 15.

A state will be assumed in which the sub-runners are joined to respective ones of the main runners. FIG. 15 is a graph in which the ratio of pressure loss $\Delta P_{SUB}$ in the sub-runners to pressure loss $\Delta P_{MAIN}$ in the main runners is plotted along the horizontal axis and flow-rate ratio representing the degree of flow distribution is plotted along the vertical axis.

The flow-rate ratio along the vertical axis is the flow-rate ratio between two main runners in each of which one shot of resin is capable of residing. The type of resin is assumed to be polypropylene. In addition, it is assumed that the set temperature $T_{m2}$ of one main runner is 270° C., the set temperature $T_{m1}$ of the other main runner is 260° C. (for a temperature differential of 10° C.) and the temperature response is 47%. Here $\Delta T = T_{m1} - T_{m2} = 10°$ C., which corresponds to the quadrant, in which Q1/Q2 is smaller than 1, in the graph of FIG. 13 (the third quadrant). The effects of shear heating due to the viscosity of the resin are not taken into consideration in these calculations. Further, the pressure-loss ratio $\Delta P_{SUB}/\Delta P_{MAIN}$ is computed based on a pressure-loss ratio obtained by assuming that sub-runner resin temperature and main-runner resin temperature are equal and that the resin is an isothermal fluid which does not exhibit shear heating. The pressure loss (ratio) can be computed based upon the rheological properties of the resin in accordance with exponential (power) laws. Furthermore, differences in the effects, described below, are very small regardless of whether the resin is assumed to be an isothermal fluid or a non-isothermal fluid.

Figure 15:
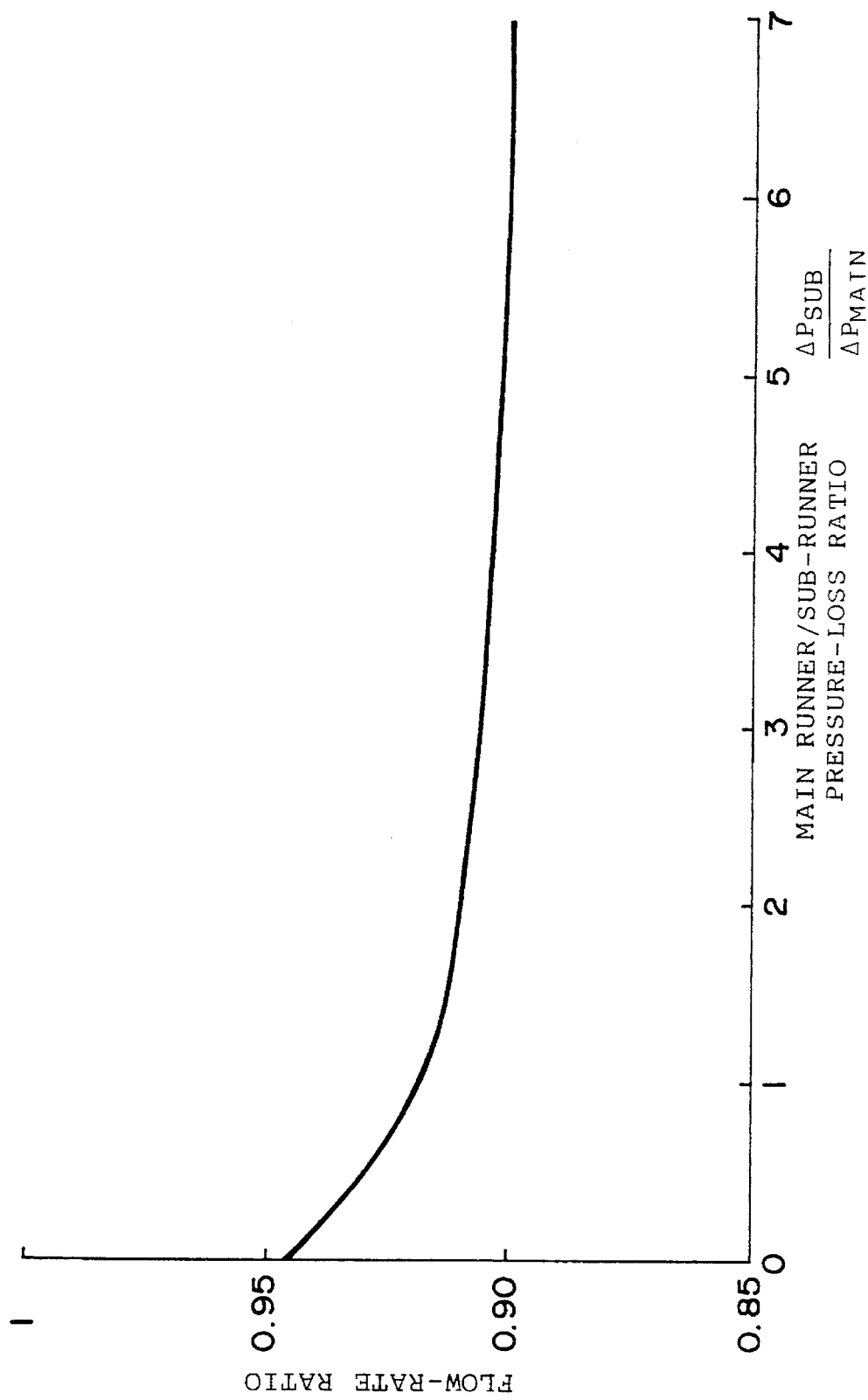
FIG. 15 is a graph showing the relationship between the ratio of sub-runner pressure loss to main-runner pressure loss and flow-rate ratio.

In the graph shown in FIG. 15, there is a tendency for the flow-rate ratio to decline as the pressure-loss ratio $\Delta P_{SUB}/\Delta P_{MAIN}$ increases (in a case where $\Delta T > 0$ holds, the flow-rate ratio increases).

The reason for this is as follows: Since one shot of resin is held in the main runners, only the resin whose flowability has been adjusted for the purpose of flow distribution passes through the sub-runners, as a result of which a sub-runner pressure loss $\Delta P_{SUB}$ is produced. The larger the pressure-loss ratio $\Delta P_{SUB}/\Delta P_{MAIN}$ becomes, i.e., the more dominant the sub-runner pressure loss $\Delta P_{SUB}$ becomes, the greater the lessening of the effect in which the rate of flow distribution is reduced by inflow of resin, which has not been subjected to temperature control for the sake of flow distribution, to the main runners from the molding machine or from hot runners whose temperatures are controlled in common at the time of injection.

If the pressure-loss ratio $\Delta P_{SUB}/\Delta P_{MAIN}$ is made sufficiently large, there is almost no influence which causes a decline in the flow distribution owing to flow or resin, which has not undergone temperature control for the purpose of flow distribution flows, into the main runners, and the flow distribution ratio converges to a value.

FIG. 15 is represented by a single curve irrespective of the absolute value of pressure loss in the main runners or sub-runners. Consequently, this serves as design data when deciding the pressure-loss ratio $\Delta P_{SUB}/\Delta P_{MAIN}$ necessary in order to suppress the hindering effect on flow distribution in the main runners and effectively manifest flow distribution.

Accordingly, the range of pressure-loss ratios for effectively manifesting flow distribution will be considered in detail.

It will be appreciated from FIG. 15 that the pressure-loss ratio $\Delta P_{SUB}/\Delta P_{MAIN}$ should be set large in order to reduce the temperature differential of the resin flowing into the cavities and achieve uniform distribution.

On the other hand, the pressure-loss ratio $\Delta P_{SUB}/\Delta P_{MAIN}$ is limited by the capability of the injection molding machine.

The molten resin from the nozzle of the injection molding machine is charged into the cavities through the main runners and sub-runners. Let $\Delta P_{NOZ}$ represent the pressure loss of the nozzle, and let $\Delta P_{CAV}$ represent the pressure loss within the cavities. Let $\Delta P_{MAX}$ represent the maximum injection pressure, which indicates the injection capability of the injection molding machine. In an injection molding machine, generally an allowable pressure loss $\Delta P_{REAL}$, which is lower than the maximum injection pressure $\Delta P_{MAX}$, is used as the limit. As will be illustrated later, $\Delta P_{REAL}$ is set at $\Delta P_{REAL} = \Delta P_{MAX} \times 0.9$ or lower.

Accordingly, the following equation holds:

$$\Delta P_{REAL} = \Delta P_{NOZ} + \Delta P_{MAIN} + \Delta P_{SUB} + \Delta P_{CAV} \qquad \text{Eq. 2}$$

The following equation is obtained in accordance with Eq.2:

$$\Delta P_{SUB}/\Delta P_{MAIN} = |(\Delta P_{REAL} - \Delta P_{NOZ} - \Delta P_{CAV})/\Delta P_{MAIN}| - 1 \qquad \text{Eq. 3}$$

The pressure-loss ratio $\Delta P_{SUB}/\Delta P_{MAIN}$ must be determined to fall in a range which does not exceed the capability of the injection molding machine. In general, based upon experience, when the nozzle pressure loss $\Delta P_{NOZ}$ and the cavity pressure loss $\Delta P_{CAV}$ are considered, the limit of $\Delta P_{MAIN} + \Delta P_{SUB}$ is in the vicinity of 1500 kgf/cm². (In a case where $\Delta P_{MAX} = 2300$ kgf/cm² holds, the maximum capability of injection molding machines on the market is of this order.) Accordingly, if $\Delta P_{MAIN}$ is reduced, it is possible to set $\Delta P_{SUB}/\Delta P_{MAIN}$ to a sufficiently large value.

However, in a case where $\Delta P_{MAIN}$ is large (a case in which the amount of resin in a molded article is large or a case in which the flowability of the resin used is poor), it is not necessarily true that a sufficiently large $\Delta P_{SUB}/\Delta P_{MAIN}$ can be set the more the hindering effect on flow distribution in the main runners is capable of being suppressed.

For example, in a case where a fairly large main-runner pressure loss (600~800 kgf/cm²) in terms of experience is set, the maximum value which $\Delta P_{SUB}/\Delta P_{MAIN}$ is capable of taking on 0.9~1.5.

On the other hand, though the effect of the improvement in flow distribution due to the setting of a large $\Delta P_{SUB}/\Delta P_{MAIN}$ (the differential value in the graph of FIG. 15) is pronounced in a region where $\Delta P_{SUB}/\Delta P_{MAIN}$ is small, the effect becomes smaller in a range where $\Delta P_{SUB}/\Delta P_{MAIN}$ is large.

In FIG. 15, let $Y_\infty$ represent the flow-rate ratio at $\Delta P_{SUB}/\Delta P_{MAIN} = \infty$, let $Y_0$ represent the flow-rate ratio at $\Delta P_{SUB}/\Delta P_{MAIN} = 0$, and let $Y$ represent the flow-rate ratio when $\Delta P_{SUB}/\Delta P_{MAIN}$ has a value. Then, if the degree of improvement in flow distribution is represented by $$\Psi = [(Y - Y_0)/(Y_\infty - Y_0)] \times 100 \qquad \text{Eq. 4}$$

we have $\Psi = 51\%$ when $\Delta P_{SUB}/\Delta P_{MAIN} = 1$ $\Psi = 68\%$ when $\Delta P_{SUB}/\Delta P_{MAIN} = 2$ $\Psi = 76\%$ when $\Delta P_{SUB}/\Delta P_{MAIN} = 3$ More specifically, at $\Delta P_{SUB}/\Delta P_{MAIN} = 1$, half of the effect of enhancing flow distribution by setting a large value for $\Delta P_{SUB}/\Delta P_{MAIN}$ is attained. It will be understood that even if calculation is performed upon changing the temperature differential, $\Psi$ will take on a value substantially in the vicinity of 50% when $\Delta P_{SUB}/\Delta P_{MAIN} = 1$ holds.

Based upon the foregoing, it is desired that the pressure-loss ratio $P_{SUB}/\Delta P_{MAIN}$ be set as large as possible. However, in view of the fact that there are instances in which a sufficiently large $P_{SUB}/\Delta P_{MAIN}$ cannot be set because of limitations as imposed by the capability of the injection molding machine, the design should be such that at least $P_{SUB}/\Delta P_{MAIN}$ is satisfied. This is the meaning of requirement (B) set forth earlier.

Thus, as set forth above, in a mold equipped with a plurality of main runners and sub-runners for respective ones of the main runners, wherein the main runners are provided with independently controllable heaters, an efficacious flow distribution can be realized by temperature control in the main runners if the shapes of the main runners and sub-runners are determined in such a manner that the aforesaid requirements (A) and (B) are satisfied under the restriction imposed by the injection capability of the injection molding machine used.

By satisfying the requirements (A) axed (B), the temperature differential of the resin charged into the plurality of cavities can be made as small as possible, as a result of which it becomes possible to achieve uniform filling of the cavities and obtain molded articles that are uniform in shape.

In addition, by satisfying requirement (B), the pressure loss of the sub-runners is made equal to or greater than the pressure loss in the main runners, as a result of which the following two effects are obtained:

First, as mentioned above, the fact that the pressure loss is large means that the sub-runners manifest strongly their self-controllability. As a result, the system is strongly resistant to outside disturbances such as fluctuations in temperature. The self-controllability of the sub-runners refers to an effect which acts in a direction to suppress a fluctuation in resin temperature. For example, when the temperature of the resin falls, viscosity increases, thereby causing an increase in shear heating which acts to elevate the temperature of the resin. As a result, the action is such that the amount of change in the temperature of the resin diminishes. The fluctuation in the resin temperature on the outlet side (at the gates) is suppressed to a low level even if there is a fluctuation in the resin temperature due a variation in the heater temperature of the main runners (which may be caused by a fluctuation in power-supply voltage or the like) or even if there is a fluctuation in the temperature of the resin flowing into the hot runners.

Second, by providing the sub-runners, which exhibit the large pressure loss, downstream of the main runners, the resin is heated instantaneously by shear heating before is flows into the cavities. The temperature of the resin which flows into the cavities therefore can be elevated substantially without causing the resin to undergo almost any heat deterioration. As a result, the resin fluidity rises and the pressure loss within the cavities falls. This makes low-pressure molding possible. Owing to the feasibility of low-pressure molding, the size (clamping force) of the mold used can be made small and becomes possible to increase the number of molded articles that can be molded at one time. This leads to higher productivity and lower cost.

A method of fabricating a multi-cavity mold having the structure set forth above will now be described.

Figure 11:
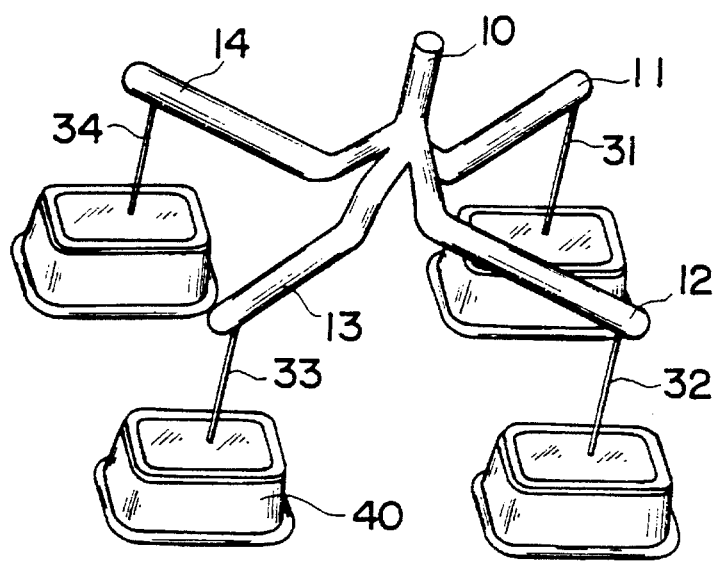
FIG. 11 is a perspective view showing a concrete example of the shapes of hot runners and cavities in a mold for molding four articles at one time in an embodiment of the present invention, wherein main-runner diameter is enlarged.
Figure 12:
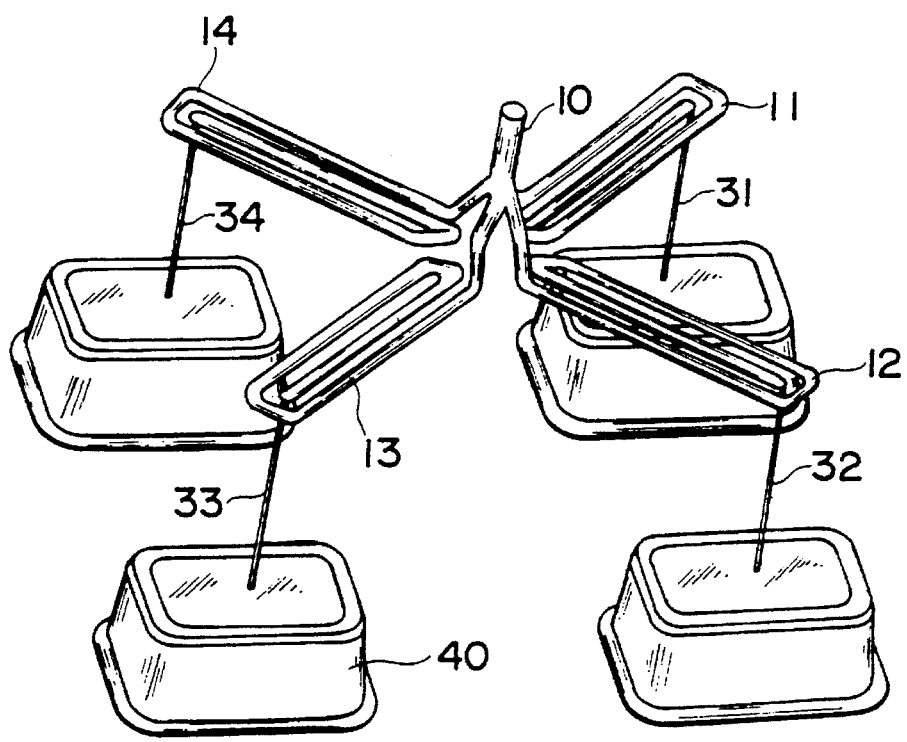
FIG. 12 is a perspective view showing a concrete example of the shapes of hot runners and cavities in a mold for molding four articles at one time in an embodiment of the present invention, wherein main-runner length is enlarged.

FIGS. 11 and 12 each illustrate the hot runners and the cavities leading to these hot runners in a multi-cavity mold. Portions in FIGS. 11 and 12 identical with those shown in FIGS. 1 through 6 are designated by like reference numerals.

The main runners 11~14 shown in FIG. 11 are formed to have a large diameter, while those shown in FIG. 12 are formed to have extended length, so as to hold enough resin to satisfy the requirement (A) described above. In particular, the main runners 11~14 in FIG. 12 are doubled back upon themselves so as to make 1.5 round trips. In both FIGS. 11 and 12, the sub-runners are formed to be fairly slender so as to produce a relatively large pressure loss to satisfy the requirement (B).

In order to increase the amount of resin held in the main runners, there are two methods, namely the method of enlarging runner diameter and the method of extending runner length, as set forth above. The length of the main runners is limited by the size of the mold and the arrangement of the cavities. On the other hand, when runner diameter is enlarged, the pressure loss in the main runners declines. This means that enlarging runner diameter is desirable. The method of enlarging runner diameter is especially useful for small molded articles. If runner diameter is made too large in a case where the molded articles are large in size and, hence, a large amount of resin is required, some of the resin is retained in the runners and a defect-causing phenomenon such as resin burn occurs. In cases such as this, the runner length should be increased. The method of extending runner length is useful for molded articles that are large in size.

In FIGS. 11 and 12, it goes without saying that the main runners 11~14 are respectively provided with flow-distribution adjusting heaters (not shown) that are controllable independently of one another. Further, the sub-runners 31~34 are provided with independently controllable flow-distribution adjusting heaters and gate finish adjusting heaters as required.

Figure 16:
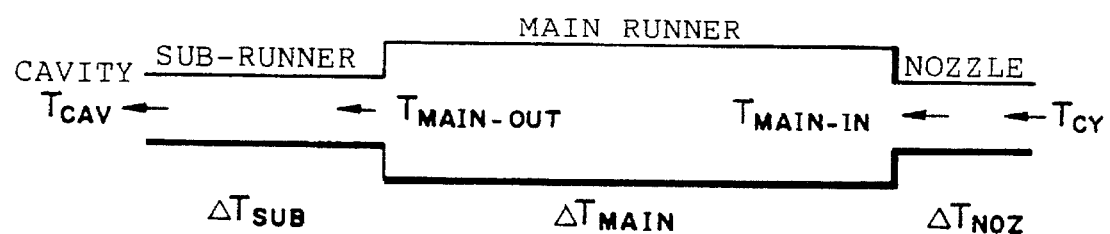
FIG. 16 is a diagram illustrating resin temperature from the nozzle of an injection molding machine to a cavity via main and sub-runners.

The configuration of the mold is determined roughly in accordance with the procedure set forth below. Of course, the procedure need not necessarily be executed in the sequence described below, a plurality of processing steps or operations may be performed in parallel, or the sequence may be reversed, as necessary. The various temperatures of the nozzle, a main runner, a sub-runner and a cavity are shown in FIG. 16 for the sake of reference.

a) Molding conditions inclusive of the temperature $T_{CAV}$ of the resin flowing into the cavity are set based upon the performance of the molding machine, the number of molded articles produced at one time and the physical, thermal and rheological properties of the resin used.

b) The temperature $T_{MAIN-IN}$ of the resin flowing into the main runner is set to lie in a temperature region in which heat deterioration of the resin will not occur.

c) The shape of the main runner is decided so as to meet the demand for the required amount of resin held (the amount of resin necessary for one molding operation) [this is the requirement (A)].

d) The temperature rise $\Delta T_{MAIN}$ due to shear heating in the main runner is calculated based upon the shape of the main runner that has been decided, and the shape of the sub-runner is decided in such a manner that the temperature rise $\Delta T_{SUB}$ obtained due to shear heating in the sub-runner will be $\Delta T_{SUB} = T_{CAV} - T_{MAIN-IN} - \Delta T_{MAIN}$.

e) The pressure loss $\Delta P_{MAIN}$ in the main runner and the pressure loss $\Delta P_{SUB}$ in the sub-runner are calculated based upon the shapes of the main and sub-runners that have been decided, and it is verified that the ratio between these two pressure losses is equal to or greater than 1 [this is the requirement (B)].

The procedure a) through e) will be described in greater detail with reference to FIGS. 17 through 19.

Figure 17:
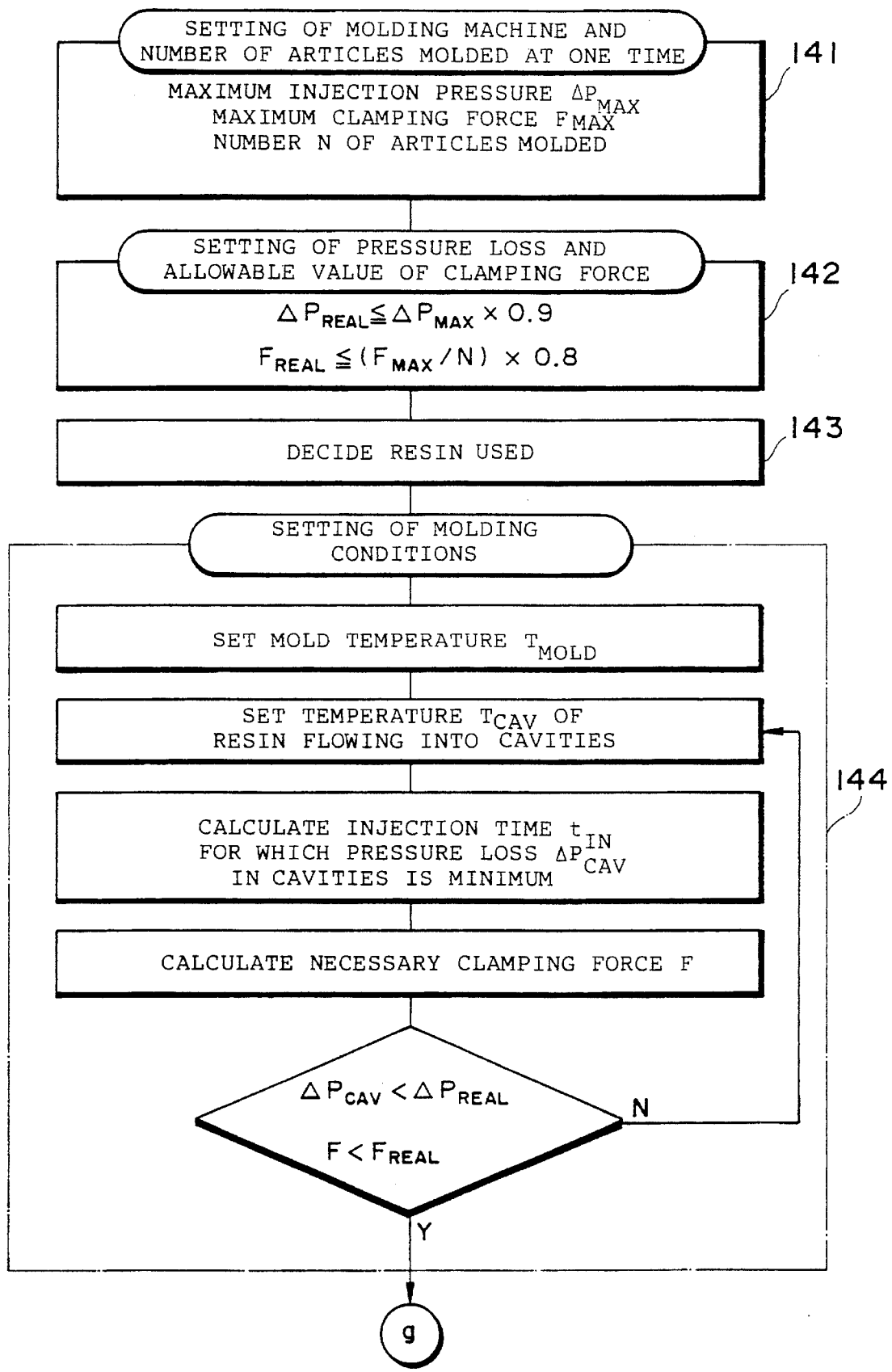
FIGS. 17 through 19 are flowcharts illustrating a procedure for deciding the shapes of main runners and sub-runners.

[a-1] Setting of the molding machine and of the number of articles molded at one time (step 141 in FIG. 17)

The molding machine is selected first. This decides the maximum injection pressure $\Delta P_{MAX}$ (e.g., 2270 kgf/cm²) and the maximum clamping force $F_{MAX}$ (e.g., 260 tons) of the molding machine. The range of mold sizes is decided based upon the platen size of the molding machine, and the number N (e.g., N=4) of articles molded at one time is decided by the size of the mold and the size of the molded articles. The setting of molding machine size and of the number of articles molded at one time is a problem directly related to productivity. Therefore, in order to find the optimum combination, several combinations are actually set and some or all of these are checked for appropriateness.

[a-2] Setting of pressure loss and clamping force (allowable value) (step 142 in FIG. 17)

The allowable pressure loss (allowable injection pressure) $\Delta P_{REAL}$ and the allowable clamping force $F_{REAL}$ per one molded article are calculated respectively from the following equations based upon the maximum injection pressure $\Delta P_{MAX}$ and maximum clamping force $F_{MAX}$ of the molding machine and taking the degree of safety into consideration:

$$\Delta P_{REAL} \leq \Delta P_{MAX} \times 0.9 \qquad \text{Eq. 5}$$

$$F_{REAL} < (F_{MAX}/N) \times 0.8 \qquad \text{Eq. 6}$$

The coefficients 0.9 and 0.8 of Eqs. 5 and 6 are coefficients (criteria) which take account of safety of the machine and molding operation.

As a result, allowable pressure loss $\Delta P_{REAL} = 2000$ kgf/cm² and allowable clamping force (per molded article) $F_{REAL} = 50$ tons are set, by way of example.

[a-3] Deciding the resin used (step 143 in FIG. 17)

The type of resin used is selected upon taking into consideration fluidity (viscosity or flowability: the higher the temperature, the easier the resin flows), thermal property (thermal stability, which declines at high temperatures) and the resin characteristics (e.g., strength) functionally required for the molded article. For example, polypropylene is decided for the resin used.

[a-4] Setting of the molding conditions (step 144 in FIG. 17)

Mold temperature (the temperature of the inner surface cooled by a coolant) $T_{MOLD}$ is set upon referring to actually recorded values and standard values based upon the resin used. The temperature $T_{CAV}$ of the resin which flows into the cavity is then set based upon experience.

Since the pressure loss $\Delta P_{CAV}$ within the cavity is decided based upon the temperatures $T_{MOLD}$ and $T_{CAV}$, injection time $t_{IN}$ is decided so as to minimize the pressure loss $\Delta P_{CAV}$ within the cavity. When it is attempted to shorten injection time, a high pressure is necessary. If the injection time is long, the resin charged into the cavity develops a solid layer which spreads and makes it difficult for the resin to enter. In this case, a high pressure is also required. An appropriate (minimum) injection time $t_{IN}$ exists for a certain pressure loss $\Delta P_{CAV}$ in the cavity. This often is determined from experience or by experimental data.

When the internal pressure loss $\Delta P_{CAV}$ of the cavity is set, the necessary clamping force $F = \Delta P_{CAV-AV} \times S_f$ (where $\Delta P_{CAV-AV}$ is the average resin pressure within the cavity and is a value that is substantially ½ of $\Delta P_{CAV}$, and $S_f$ is the project area of the molded particle upon a surface perpendicular to the mold opening/closing direction) is calculated.

A check is made to see whether the internal pressure loss $\Delta P_{CAV}$ of the cavity and the necessary clamping force F thus decided are smaller than the allowable pressure loss $\Delta P_{REAL}$ and the allowable clamping force $F_{REAL}$, respectively, determined as step 142, i.e., whether the relations $\Delta P_{CAV} < \Delta P_{REAL}$ and $F < F_{REAL}$ are satisfied. If these conditions are not satisfied, the temperature $T_{CAV}$ of the resin which flows into the cavity is changed and the computation of $t_{IN}$ and the calculation of F described earlier are repeated.

As a result, the values decided are as follows, by way of example: injection time $t_{IN}$=0.35 sec; temperature $T_{CAV}$ (of the resin which flows into the cavity)=305° C.; mold temperature $T_{MOLD}$=40° C.; cavity internal pressure loss $\Delta P_{CAV}$=600 kgf/cm$^2$; and necessary clamping force F=49 tons.

Figure 18:
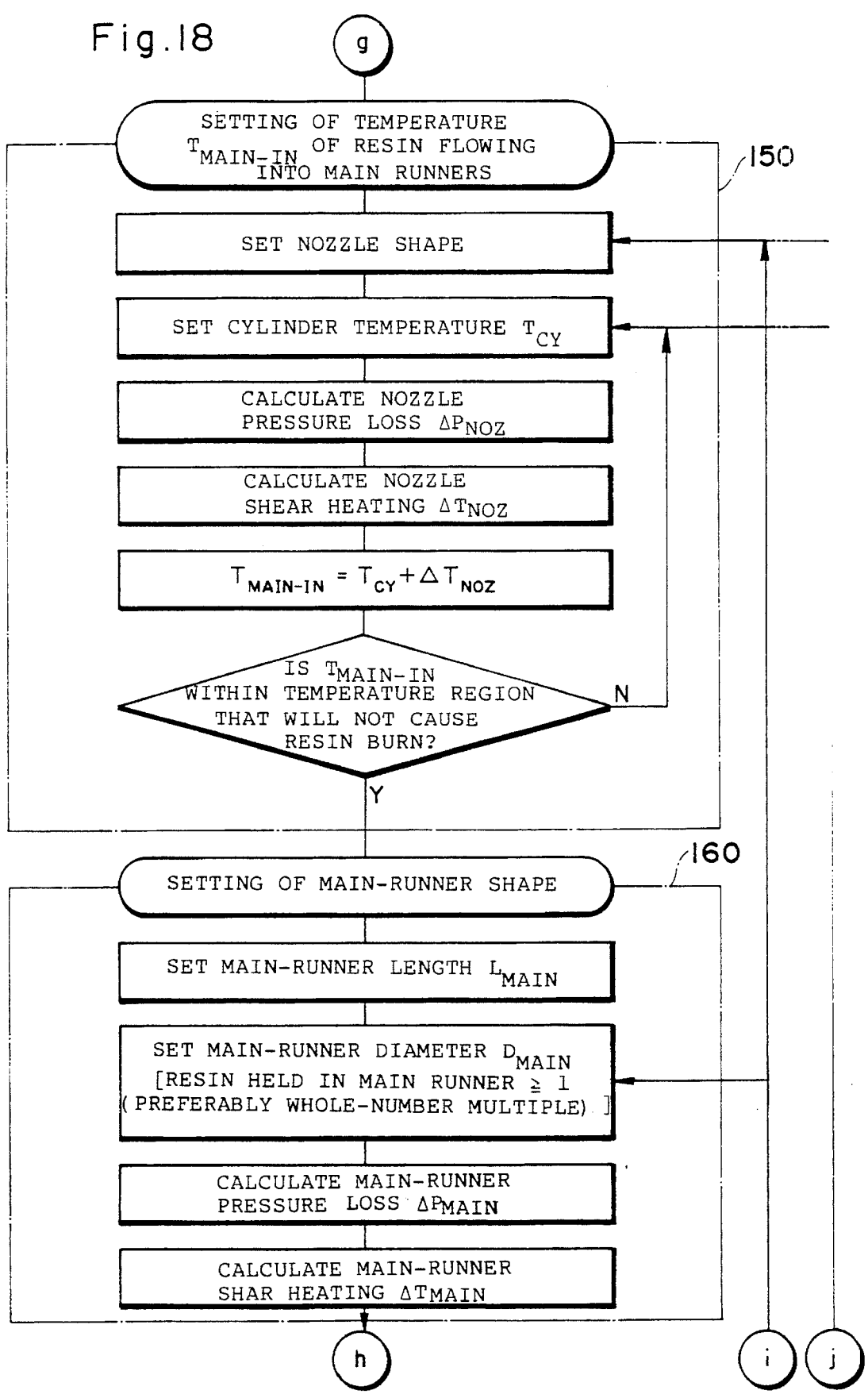

[b] Setting of the temperature $T_{MAIN-IN}$ of the resin which flows into the main runners (step 150 in FIG. 18)

The shape of the nozzle is set first. At the start, a standard shape is selected.

Next, the cylinder temperature (the temperature of the resin which flows in from the cylinder) $T_{CY}$ of the injection molding machine is set. In order to perform molding at as low a pressure as possible, and in order to prevent resin burn (deterioration of the resin due to thermal decomposition), reference is made to values based upon actual performance and to the standard values to set a temperature which is as high as possible but which will not cause resin burn.

The nozzle pressure loss $\Delta P_{NOZ}$ is calculated in dependence upon the selected nozzle shape and the temperature rise $\Delta T_{NOZ}$ due to shear heating in the nozzle is calculated.

$$\Delta T_{NOZ} = \Delta P_{NOZ}/(C_p \times \rho) = a \cdot \Delta P_{NOZ} \qquad \text{Eq. } 7a = 1/(C_p \times \rho)$$

where $C_p$ represents the specific heat of the resin and $\rho$ represents the density of the resin.

The temperature $T_{MAIN-IN}$ of the resin which flows into the main runners is calculated based upon the foregoing.

$$T_{MAIN-IN} = T_{CY} + \Delta T_{NOZ} \qquad \text{Eq. 8}$$

It is required that the temperature $T_{MAIN-IN}$ of the resin flowing into the main runners is below the temperature $T_{CAV}$ of the resin flowing into the cavities, and does not exceed an upper limit value which will not cause resin burn. In a case where the temperature $T_{MAIN-IN}$ of the resin flowing into the main runners exceeds an upper-limit value, the low cylinder temperature $T_{CY}$ is set again and the above-described calculation is repeated. If the temperature $T_{MAIN-IN}$ is too low, a higher injection pressure will be necessary, and therefore it is required that $T_{MAIN-IN}$ be a temperature which does not exceed the injection-pressure limit ($\Delta P_{REAL}$=2000 kgf/cm$^2$) of the molding machine.

Accordingly, the following values are set, by way of example: cylinder temperature $T_{CY}$=270° C.; nozzle pressure loss $\Delta P_{NOZ}$=300 kgf/cm$^2$; temperature rise $\Delta T_{NOZ}$ (in the nozzle due to shear heating) =10° C.; and temperature $T_{MAIN-IN}$ (of the resin which flows into the main runners)= 280° C.

Figure 19:
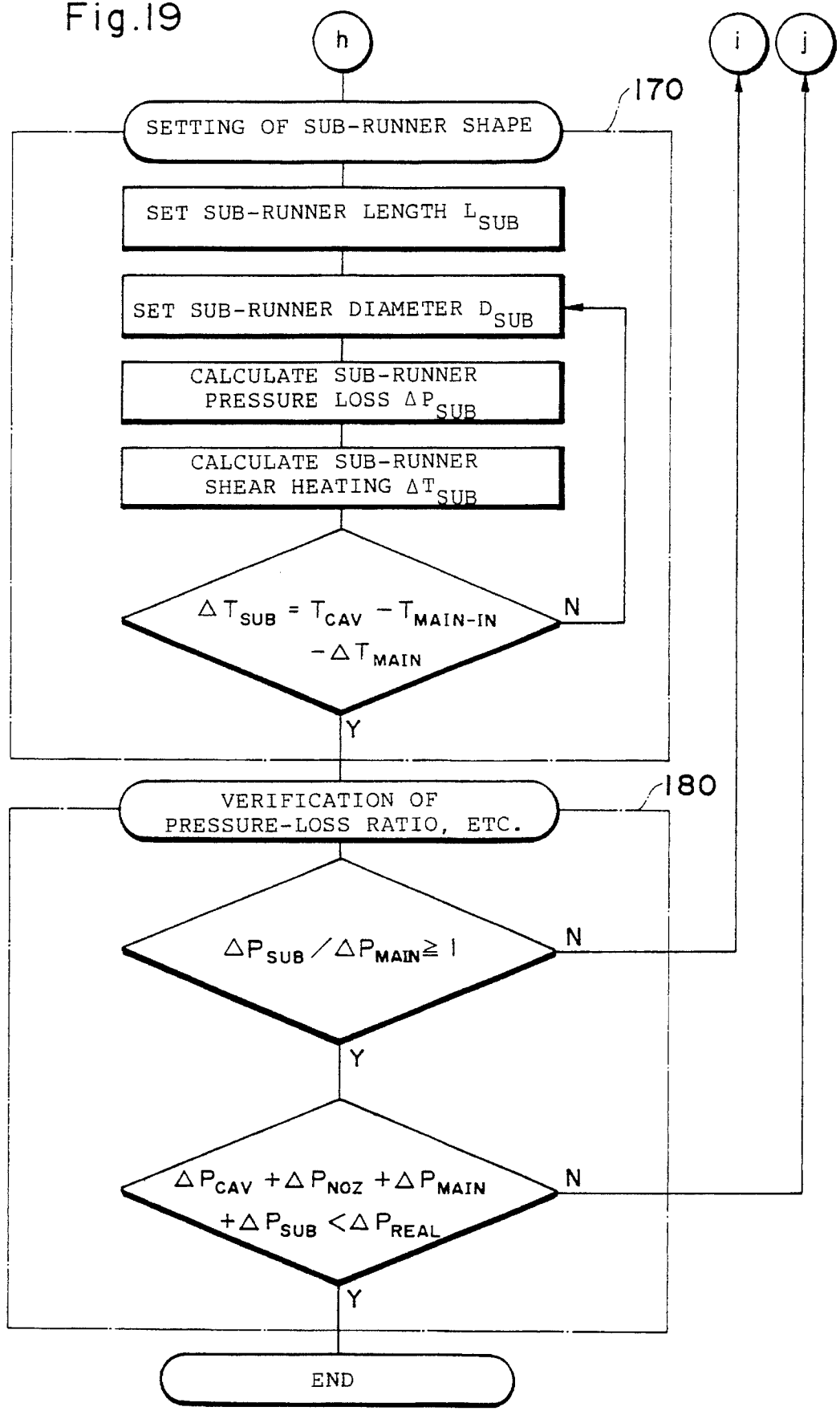

[c and d] Designing of hot-runner shape (step 160 in FIG. 18 and step 170 in FIG. 19)

The temperature $T_{CAV}$ of the resin which flows into the cavities (see FIG. 16) is represented by the following equation:

$$T_{CAV} = T_{CY} + \Delta T_{NOZ} + \Delta T_{MAIN} + \Delta T_{SUB} \qquad \text{Eq. 9}$$
$$= T_{MAIN-IN} + \Delta T_{MAIN} + \Delta T_{SUB}$$

where $T_{CY}$ represents the temperature of the resin flowing in from the cylinder, $\Delta T_{NOZ}$ the temperature rise in the nozzle due to shear heating, $\Delta T_{MAIN}$ the temperature rise in the main runners due to shear heating, $\Delta T_{SUB}$ the temperature rise in the sub-runners due to shear heating, and $T_{MAIN-IN}$ the temperature ($T_{CY} + \Delta T_{NOZ}$) of the resin flowing into the main runners, as mentioned earlier.

The temperature $T_{CAV}$ of the resin which flows into the cavities is decided at step 144 (e.g., 305° C.). The temperature $T_{MAIN-IN}$ (=$T_{CY}+\Delta T_{NOZ}$) of the resin flowing into the main runners is set at step 150 (e.g., 280° C.). Accordingly, what is sought is the sum ($\Delta T_{MAIN}+\Delta T_{SUB}$) of the temperature rise $\Delta T_{MAIN}$ in the main runners due to shear heating and the temperature rise $\Delta T_{SUB}$ in the sub-runners due to shear heating. This is $T_{CAV}-T_{MAIN-IN}$ (e.g., 25° C.) from Eq. 9.

The shapes of the main runners and sub-runners (length and diameter) are decided as set forth below upon taking the above conditions and the requirements (A) and (B) into account:

[c] Setting of main-runner shape (deciding main-runner length $L_{MAIN}$ and diameter $D_{MAIN}$) (step 160 in FIG. 18)

Main-runner length $L_{MAIN}$ and main-runner diameter $D_{MAIN}$ are decided so as to satisfy the demand for the necessary amount of resin held in the main runners equal to or more than one shot, in accordance with the requirement (A)]. More specifically, since the structure of the mold imposes a limitation upon main-runner length $L_{MAIN}$, the shape of the main runners may, for example, be such that they are doubled back upon themselves so as to make 1.5 round trips, as shown in FIG. 12, in a case where the amount of resin in the molded articles is large. After main-runner length $L_{MAIN}$ has been decided, main-runner diameter $D_{MAIN}$ is decided in such a manner that the amount of resin held in the held in the main runners will be equal to or more than one shot (and preferably a whole-number multiple thereof). Generally, main-runner length and diameter would be decided at the same time.

When the shape of the main runners has been decided, the pressure loss $\Delta P_{MAIN}$ in the main runners is calculated and so is the temperature rise $\Delta T_{MAIN}$=a$\times \Delta P_{MAIN}$ (where a is the coefficient mentioned earlier) in the main runners due to shear heating.

[d] Setting of sub-runner shape (deciding sub-runner length $L_{SUB}$ and diameter $D_{SUB}$) (step 170 in FIG. 19)

The sub-runner length $L_{SUB}$ and diameter $D_{SUB}$ are decided in such a manner that the temperature rise $\Delta T_{SUB}$ in the sub-runners due to shear heating will satisfy Eq. 9, i.e., in such a manner that the equation $\Delta T_{SUB}=T_{CAV}-T_{MAIN-IN}-\Delta T_{MAIN}$ will hold. More specifically, since the mold structure (mold thickness) imposes a limitation upon the sub-runner length $L_{SUB}$, the latter is decided in accordance with the structure of the mold. A provisional sub-runner diameter $D_{SUB}$ is set appropriately. The pressure loss $\Delta P_{SUB}$ in the sub-runners is calculated from sub-runner diameter $D_{SUB}$, the sub-runner length $L_{SUB}$ already decided, the temperature $T_{MAIN-OUT}$ (=$T_{MAIN-IN}+\Delta T_{MAIN}$) of the resin flowing out of the main runners, etc. The temperature rise $\Delta T_{SUB}$= a$\times \Delta P_{SUB}$ (where a is the coefficient mentioned earlier) in the sub-runners due to shear heating is calculated and it is determined whether this satisfies Eq. 9. If it does satisfy Eq. 9, the provisional sub-runner diameter is formally adopted. If $\Delta T_{SUB}$ does not satisfy Eq. 9, the sub-runner diameter $D_{SUB}$ is set again and the above-described calculation is repeated. Thus, a sub-runner diameter $D_{SUB}$ which will provide the desired temperature rise $\Delta T_{SUB}$ due to shear heating will eventually be decided.

[e] Verifying the pressure losses, etc., of the main and sub-runners (step 180 in FIG. 19)

Since the shapes of the main and sub-runners are set and the pressure loss $\Delta P_{MAIN}$ of the main runners and the pressure loss $\Delta P_{SUB}$ of the sub-runners are calculated above, a check is made to determine whether the ratio of pressure loss $\Delta P_{SUB}$ to pressure loss $\Delta P_{MAIN}$ and the total of the pressure losses fall within the following limits:

$$\Delta P_{SUB}/\Delta P_{MAIN} \geq 1 \qquad \text{Eq. 1}$$

$$\Delta P_{CAV}+\Delta P_{NOZ}+\Delta P_{MAIN}+\Delta P_{SUB}<\Delta P_{REAL} \qquad \text{Eq. 10 (Eq. 2 or Eq. 3)}$$

If Eq. 1 is not satisfied, the main-runner diameter $D_{MAIN}$ is increased to decrease $\Delta P_{MAIN}$, the cylinder temperature $T_{CY}$ is set again to the low-temperature side and sub-runner shape is set again, or the nozzle shape is set again and sub-runner shape is set again.

If Eq. 10 is not satisfied, measures are taken such as setting the cylinder temperature $T_{CY}$ to the high-temperature side again, setting the nozzle shape again or providing one cavity with a plurality of gates in order to reduce the flow rate.

Specifically, in this embodiment, the values are $\Delta P_{MAIN}=200$ kgf/cm$^2$ and $\Delta P_{SUB}=550$ kgf/cm$^2$. At this time, the overall pressure loss $\Sigma \Delta P$ becomes $\Delta P_{NOZ}+ \Delta P_{MAIN}+\Delta P_{SUB}+\Delta P_{CAV}=300+200+550+600=1650$ kgf/cm$^2$. This is within the capability limit ($\Delta P_{REAL=}$ 2000 kgf/cm$^2$) of the molding machine.

Finally, the heaters provided in the hot runners are set. In particular, heater capacity is set to an appropriate value. More specifically, in order to enlarge the temperature response of the hot runner block, it is preferred that heater capacity be made as large as possible. If heater capacity is too large, however, the heaters themselves are not used efficiently and the electric power for the heaters is wasted. For this reason, heater capacity should only be large enough to obtain the desired characteristics. With regard to hot-runner-block temperature response, capacity is set so that temperature will change from 30° C. to 280° C. in 10 min at start-up and from 250° C. to 280° C. in 1 min when the set temperature is changed, by way of example. If heater capacity is inappropriate, the following difficulties arise and therefore should be taken into consideration: If heater capacity is too small, a long period of time will be needed for the temperature to rise to the desired temperature, or the desired temperature will not be attained, owing to the large thermal capacity of the hot runners and the migration of heat from the hot-runner block to the mold. If heater capacity is too large, it will be difficult to maintain the hot-runner block at a constant temperature by on/off control of the heaters, and a fluctuation in the temperature of the hot-runner block will occur.

In the description given above, the gates provided between the sub-runners and the cavities are not discussed. However, the gates are set to a diameter on the order of 1 mm, which is common in the art, in view of the external appearance of the article and ease of maintenance when clogging occurs. Though shear heating is produced owing to pressure loss in the gates as well, the gates can be thought of as being part of the sub-runners and therefore it will suffice for the matter of shear heating to be considered when the shape of the sub-runners is decided.

As many apparently widely different embodiments of the present invention can be made without departing from the spirit and scope thereof, it is to be understood that the invention is not limited to the specific embodiments thereof except as defined in the appended claims.

What is claimed is:

1. A multi-cavity mold apparatus, comprising:

a plurality of sets of runners, each of said sets of runners comprising a first runner and a second runner;

said first runner of each of said sets of runners having a proximal end and a distal end, a proximal end of said first runner of each of said sets of runners being attached to a supply of molten resin, said first runner being capable of holding an amount of molten resin necessary for at least one molding operation;

said second runner of each of said sets of runners being attached on a first end of a corresponding said first runner at said distal end, a second end of said second runner serving as a gate facing a cavity;

each of said plurality of sets of runners further comprising (i) first independently controllable temperature regulating means for flow-distribution adjustment and (ii) second independently controllable temperature regulating means for gate finish adjustment, said first independently controllable temperature regulating means being provided on said first runner of each of said sets of runners for regulating the temperature of the molten resin necessary for at least one molding operation held therein, and said second independently controllable temperature regulating means being provided on said second runner of each of said sets of runners for regulating the temperature of the molten resin in the gate portion for gate finish adjustment;

wherein said first and second independently controllable temperature regulating means enable (i) a temperature of each of said plurality of sets of runners to be independently controlled and (ii) a temperature of each of said first and second runners of said plurality of sets to be independently controlled.

2. An apparatus according to claim 1, wherein a flow passage cross-sectional area of at least one of said second runners is less than a flow passage cross-sectional area of at least one of said first runners.

3. An apparatus according to claim 1, wherein said second independently controllable temperature regulating means is provided in respective ones of said second runners.

\* \* \* \* \*